United States Patent
Almalki et al.

(10) Patent No.: US 12,433,556 B2
(45) Date of Patent: Oct. 7, 2025

(54) IMAGE ENHANCEMENT METHOD FOR ANALYSIS OF MAMMOGRAM IMAGES

(71) Applicant: NAJRAN UNIVERSITY, Najran (SA)

(72) Inventors: Yassir Edrees Almalki, Najran (SA); Toufique Ahmed Soomro, Larkana (PK); Muhammad Irfan, Najran (SA); Sharifa Khalid Alduraibi, Buraydah (SA); Ahmed Ali, Larkana (PK)

(73) Assignee: NAJRAN UNIVERSITY, Najran (SA)

( * ) Notice: Subject to any disclaimer, the term of this patent is extended or adjusted under 35 U.S.C. 154(b) by 536 days.

(21) Appl. No.: 17/982,141

(22) Filed: Nov. 7, 2022

(65) Prior Publication Data

US 2024/0148349 A1 May 9, 2024

(51) Int. Cl.
A61B 6/00 (2024.01)
A61B 6/50 (2024.01)
(Continued)

(52) U.S. Cl.
CPC ............ *A61B 6/502* (2013.01); *A61B 6/5211* (2013.01); *G06T 5/77* (2024.01); *G06T 7/0012* (2013.01); *G16H 30/40* (2018.01)

(58) Field of Classification Search
CPC ...... A61B 6/502; A61B 6/5211; G16H 30/40; G06T 5/77; G06T 7/0012
See application file for complete search history.

(56) References Cited

U.S. PATENT DOCUMENTS

| | | | |
|---|---|---|---|
| 2018/0075628 A1* | 3/2018 | Teare | G06F 18/24143 |
| 2018/0168531 A1 | 6/2018 | Abdolell et al. | |
| 2020/0381608 A1 | 12/2020 | Olivadese et al. | |

FOREIGN PATENT DOCUMENTS

| | | |
|---|---|---|
| CN | 104182755 A | 12/2014 |
| KR | 10-2011-0039897 | 4/2011 |
| WO | 2016/057960 A1 | 4/2016 |

OTHER PUBLICATIONS

MarÃn, D., A New Supervised Method for Blood Vessel Segmentation in Retinal Images by Using Gray-Level and Moment Invariants-Based Features (Year: 2011).*

(Continued)

*Primary Examiner* — Stephen S Hong
*Assistant Examiner* — Carl E Barnes, Jr.
(74) *Attorney, Agent, or Firm* — Oblon, McClelland, Maier &Neustadt, L.L.P.

(57) ABSTRACT

A method of processing a mammogram image, including receiving a digital mammography image of a breast of a patient, and separating the digital mammography image into three channels. The method includes removing noise and uneven illumination to form a first set of three uniform background images, and separating a luminance channel and a chrominance channel from the first set with a transfer function to form a second set of three uniform background images. The method includes applying principal component analysis to the second set; and assembling a single grayscale image and applying a first subspace projection. The method includes removing at least a portion of a pectoral muscle from the grayscale image, and normalizing the muscle removed image using a second order Gaussian Laplacian and an oriented diffusion filter to form a processed image. The method includes identifying cancerous and/or noncancerous regions in the processed image.

19 Claims, 18 Drawing Sheets

(51) Int. Cl.
  *G06T 5/00* (2024.01)
  *G06T 5/77* (2024.01)
  *G06T 7/00* (2017.01)
  *G16H 30/40* (2018.01)

(56) References Cited

OTHER PUBLICATIONS

Almalki, Y., Impact of Image Enhancement Module for Analysis of Mammogram Images for Diagnostics of Breast Cancer (Year: 2022).*

Yin, et al. ; Tensor based multichannel reconstruction for breast tumours identification from DCE-MRIs ; Plos One ; Mar. 10, 2017 ; 26 Pages.

* cited by examiner

302

304

306

308

IMAGE ENHANCEMENT METHOD FOR ANALYSIS OF MAMMOGRAM IMAGES

STATEMENT OF PRIOR DISCLOSURE BY INVENTOR

Aspects of the present disclosure are described in Y. E. Almalki, T. A. Soomro, M. Irfan, S. K. Alduraibi, and A. Ali. "Impact of Image Enhancement Module for Analysis of Mammogram Images for Diagnostics of Breast Cancer"; Sensors; Feb. 26, 2022; 22, 1868, incorporated herein by reference in its entirety.

BACKGROUND

Technical Field

The present disclosure is directed to an image enhancement method for analysis of mammogram images for diagnostics of breast cancer.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cancer is a large group of diseases that can start in almost any organ or in any tissue of the body when abnormal cells grow uncontrollably. Cancer is the second leading cause of death globally, accounting for an estimated 9.6 million deaths in 2018. Early diagnosis of cancer focuses on detecting symptomatic patients as early as possible, so they have a higher chance of successful treatment. When the detection of cancer is delayed, there is a lower chance of survival and enormous problems associated with the treatment and thereby increasing the medical costs.

Breast cancer is one of the most invasive and deadly cancers in women around the world. Existing diagnosis methods such as biopsy, medical imaging, and genetic analysis cannot be used frequently for routine screening as these methods are lengthy and complex. These diagnostic methods hinder high-risk populations from seeking immediate medical care. There are several imaging techniques, such as mammography, sonography, magnetic resonance, and image-guided biopsy that are used to detect any malignant changes in a breast. For example, breast imaging is a multimodal approach that plays an essential role in the diagnosis of breast cancer. There are two factors for the detection of breast cancer at an early stage: a proper acquisition of images of the breast and an accurate analysis of the images for the diagnosis of breast cancer.

Mammography is the most popular method of observing breast cancer because mammography radiates much lower radiation doses than other conventional imaging techniques. In mammography, a plurality of mammogram images are scanned for analysis of breast cancer. Mammography plays an essential role in detecting breast cancer early and helping to reduce the death rate. Several factors, such as breast tissue density and potentially hidden areas, affect the quality of the mammography images. Therefore, it is difficult for a radiologist to make an informed decision about the cancer and course of medications. To overcome such issues, computational methods such as image processing techniques or breast cancer analysis algorithms can be employed. These algorithms lead to rapid analysis and reduce the workload of medical experts. However, the computational methods are prone to observing the pectoral muscles and suffer from low contrast, which made it difficult to see cancerous areas. The quality of mammography images can be improved by using image enhancement techniques. The image enhancement techniques enhance correct observation and help segment abnormal regions for disease classification. The image enhancement techniques also help to detect mammographic lesions with poor visibility and improve low contrast. Normally, the low-contrast regions with small abnormalities are mostly hidden in the tissue of mammogram images, which makes it challenging to analyze the abnormal region and also provides false detection.

A region-based image enhancement method is best suited for contrast enhancement of a specified region of varying shape and size, but sometimes it introduces artifacts that lead to misclassification. The conventional image enhancement techniques are used for the enhancement of mammogram images but suffer from the presence of high frequencies acting as noise.

Accordingly, it is one object of the present disclosure to provide an image enhancing method for the analysis of mammogram images for the diagnosis of breast cancer in an effective, efficient, and accurate manner.

SUMMARY

In an exemplary embodiment, a method of processing a mammogram image is disclosed. The method includes receiving a digital mammography image of a breast of a patient. The method further includes separating the digital mammography image into three channels, red, green and blue, to obtain three channel images. The method further includes removing at least a portion of noise and uneven illumination from each of the three channel images to form a first set of three uniform background images. The method further includes separating a luminance channel and a chrominance channel from the first set of three uniform background images with a transfer function to form a second set of three uniform background images. The method further includes applying principal component analysis (PCA) to the second set of the three uniform background images to determine an eigenvalue and corresponding eigenvector. The method further includes assembling a single grayscale image from a weight of the eigenvalues and corresponding eigenvectors and applying a first subspace projection. The method further includes removing at least a portion of a pectoral muscle from the grayscale image with a seed region growth technique to obtain a muscle removed image. The method further includes normalizing the muscle removed image using a second order Gaussian Laplacian (LoG) and an oriented diffusion filter to form a processed image. The method further includes identifying cancerous and/or non-cancerous regions in the processed image and diagnosing the patient.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
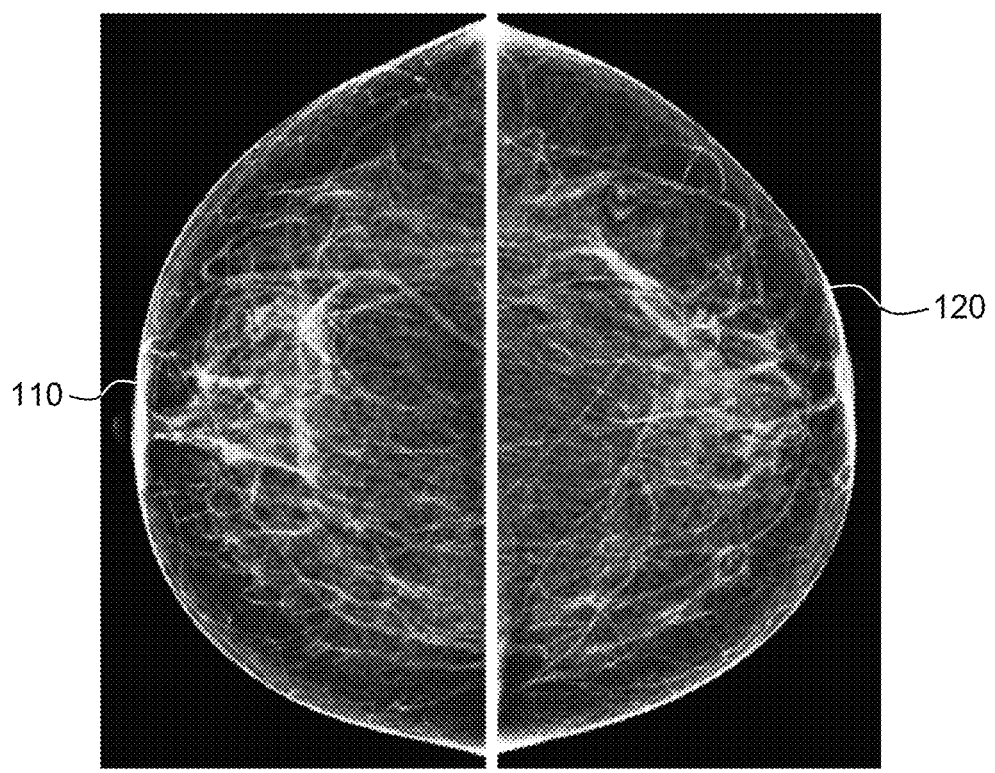
FIG. 1A illustrates a standard carnio-caudal (CC) mammography view of a right breast and a left breast according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a method of processing a mammogram image. The disclosed method is configured to enhance mammogram images in order to detect and segment a cancerous region, thereby increasing the sensitivity and overall performance of the breast cancer detection system. Using an integrated mobile application or cloud-based network, a medical expert is able to easily send the mammogram image for processing by the disclosed method and then can analyze the processed image to determine the progress of the disease. The medical expert can perform a real-time analysis of the patient image and can detect the disease as soon as possible and recommend further treatment.

In various aspects of the disclosure, non-limiting definitions of one or more terms that will be used in the document are provided below.

A term "cranio-caudal (CC) view" may be defined as a top-bottom view of a breast.

A term "mediolateral oblique (MLO) view" may be defined as side view of a breast taken at a certain angle.

BI-RADS (Breast Imaging Reporting and Data System) is a mammographic standardization and quality assurance lexicon report represented by the American College of Radiology (ACR). The main objective of BI-RADS is to organize mammography report among radiologists and homogenize the mammography report for clinicians. BI-RADS mammography classifies qualitative characteristics and characterizes the shape, margin, and density of the mass of breast tissue. Radiologists categorized the mass in BI-RADS according to the defined features, as explained in Table 1.

TABLE 1

Radiological categorization of breast tissue mass in BI-RADS.

| Category | Remarks |
|---|---|
| 00 | Process is incomplete and requires further assessment. |
| 01 | It is negative and there are no abnormities. |

TABLE 1-continued

Radiological categorization of breast tissue mass in BI-RADS.

| Category | Remarks |
|---|---|
| 02 | It is an initial stage (It is benign of breast cancer). |
| 03 | It is a mild stage (It is probably benign of breast cancer). |
| 04 | It is a moderate stage (It is suspicious of breast cancer). |
| 05 | It is a high malignancy stage (It is highly suspicious of cancer). |
| 06 | It is the final stage and known biopsy-proven malignancy. |

The breast's internal structures are observed by a low dose X-ray, and this process is called mammography in biological terminology. Mammography is one of the most necessary methods of observing breast cancer because mammography radiates much lower radiation doses than other devices and methods previously used. Analysis of the mammography images is very challenging because of the pectoral muscles. The geometric shape of the pectoral muscles and their location depend on the mammographic images' specific view. The CC view and MLO view are two standard projections in screening mammography.

FIG. 1A illustrates the carnio-caudal (craniocaudal or CC) views of a right breast and a left breast. As shown in FIG. 1A, section 110 indicates the CC view of the right breast and section 120 indicates the CC view of the left breast. For the CC view, the breast is positioned as far forward as possible such that the pectoral muscle on a posterior edge of the breast can be captured. For performing effective mammography, the CC view requires an external lateral portion of the breast in which is a retromammary space (Chassaignac's bag), the pectoral muscle on a posterior edge, and the nipple in profile are to be clearly displayed. The pectoral muscle on the CC view is semi-elliptical along the breast wall as shown in FIG. 1A.

Figure 1B:
FIG. 1B illustrates a standard mediolateral oblique (MLO) mammography view of a right breast and left breast, according to certain embodiments.

FIG. 1B illustrates the mediolateral oblique (MLO) views of the right breast and the left breast. As shown in FIG. 1B, 140 indicates the MLO view of the right breast and 160 indicates the MLO view of the left breast. The MLO view covers most of the upper mammogram coverage and corresponds to an overlapping right-angled triangle, as shown in FIG. 1B. Due to their appearance, both views (CC view and MLO view) suffered from a low contrast, resulting cumbersome task for the medical expert to see cancerous areas efficiently.

To overcome such limitations of conventional systems and methods, an image enhancement processing method is required. The quality of the mammography images in terms of noise reduction and contrast enhancement is improved using an image enhancement technique. The image enhancement technique helps a computerized breast cancer detection system to detect mammographic lesions with poor visibility and improves the contrast of the mammography images. Low contrast regions with small abnormalities are mostly hidden in the tissue of mammogram images, which makes it challenging to analyze the abnormal region, and also provides false detection.

Figure 2:
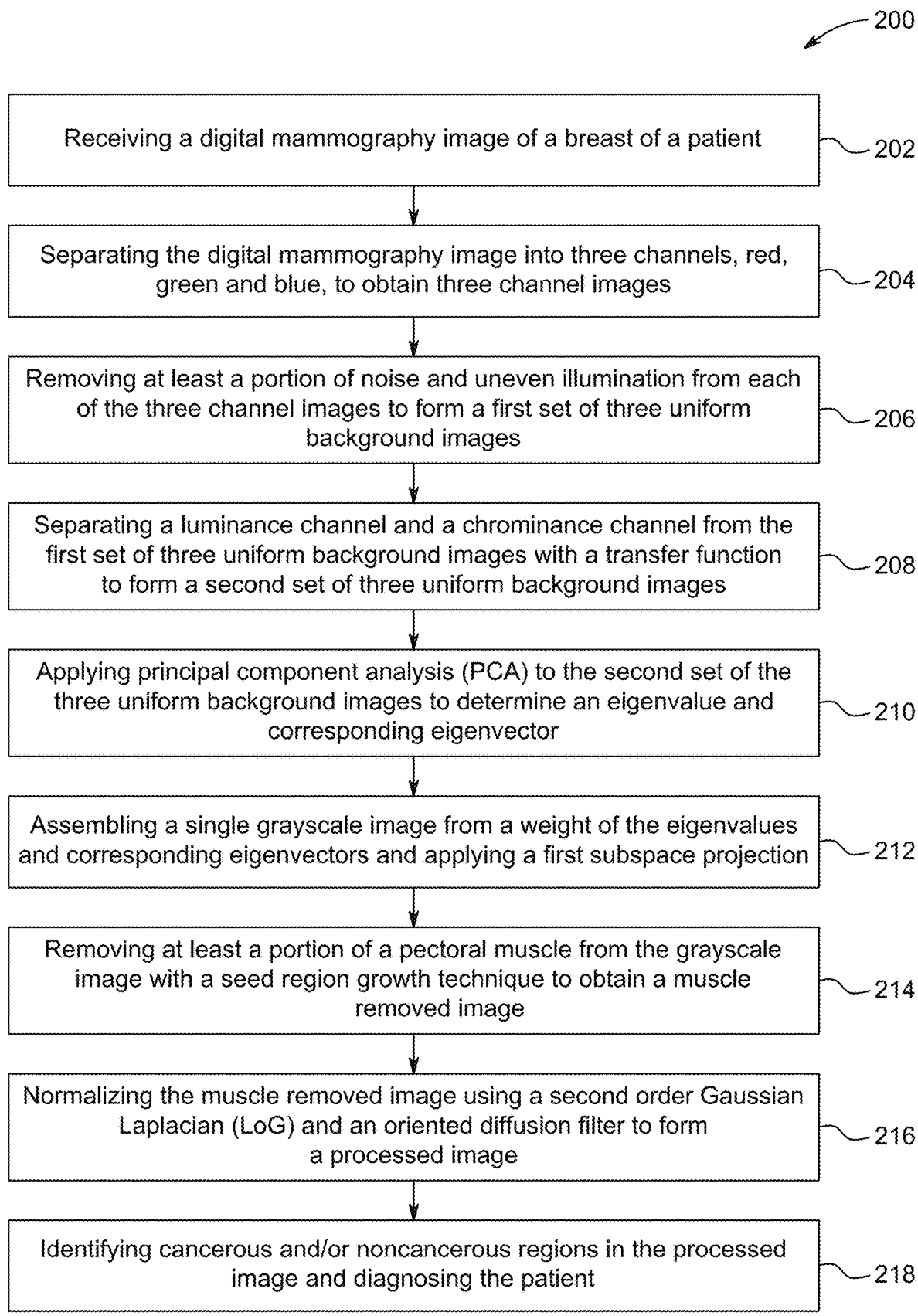
FIG. 2 illustrates a block diagram of processing a mammogram image by the method 200, according to certain embodiments.

The present disclosure discloses an image enhancement technique, or breast cancer image enhancement technique, for mammography images for early detection of breast cancer. FIG. 2 illustrates a method 200 of processing a mammogram image, according to certain embodiments.

Step 202 includes receiving a digital mammography image of the breast of the patient from a computing device via an input unit. In an aspect, the received digital mammography image (an input image) is processed to obtain an enhanced image as an output. In an example, the input unit and the computing device may be a desktop computer, a laptop, a tablet computer, a smartphone, a mobile device, an image sensor, a Personal Digital Assistant (PDA), a camera, or any other computing device that has processing capabilities. In an aspect, the input unit is configured to receive an input such as a photo, an image, a video, or image information.

In an embodiment, the images is taken by any suitable mammography machine in any suitable environment such as a hospital or doctor's office. In an example, the digital mammography image of the breast is received from a hospital and the processed image is sent back to the hospital for diagnosing the patient. In an aspect, the digital mammography image of the breast is received from the hospital and sent back to the hospital via a cloud based system. In another aspect, the digital mammography image of the breast is received from the hospital and sent back to the hospital via a smart phone application, installed on a user device.

There are two types of mammography: film screen mammography and digital mammography. In an example, the method 200 is configured to use digital mammography (also known as full field digital mammography (FFDM)). In FFDM, an X-ray film is replaced by a plurality of solid-state detectors that are configured to convert X-rays into electrical signals. In an aspect, the plurality of solid-state detectors are similar to the detectors found in a conventional digital camera. The electrical signals are used to produce images of the breast that can be seen on a computer screen or printed, e.g., on a special film. The produced images can be stored on the computing device or can be transformed to the input unit directly. In an aspect, the digital mammography image can be stored in the computing device in an image format, such as JPEG, TIFF, GIF, PNG, or another appropriate standard. In an example, the computing device is configured to perform data conversion between these multiple image formats. In some examples, the computing device is configured to pre-process the produced images by employing various operations such as encoding, image down-scaling, splitting into single full-resolution frames, uncompressing, compressing, and grouping frames.

Step 204 includes separating the digital mammography image into three channels, red, green, and blue, to obtain three channel images. The received digital mammography image is in JPEG format (RGB image), thereby the digital mammography image is converted into three channels (red, green, and blue). Each converted channel has different properties, and therefore, each channel should undergo processing for background uniformity. The objective of the method 200 is to obtain a grayscale image as the output. The obtained grayscale image is processed in several detectors for observations of cancerous regions. The grayscale images are most commonly used in image processing because the grey image takes less processing time.

Figure 3A:
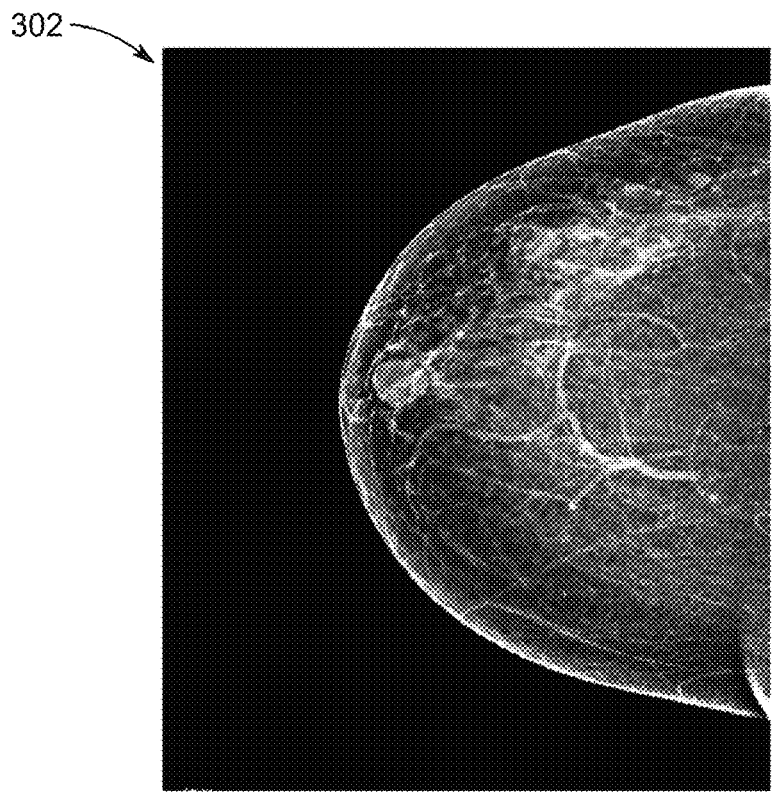
FIG. 3A illustrates a mammograph image as an input for processing, according to certain embodiments.
Figure 3B:
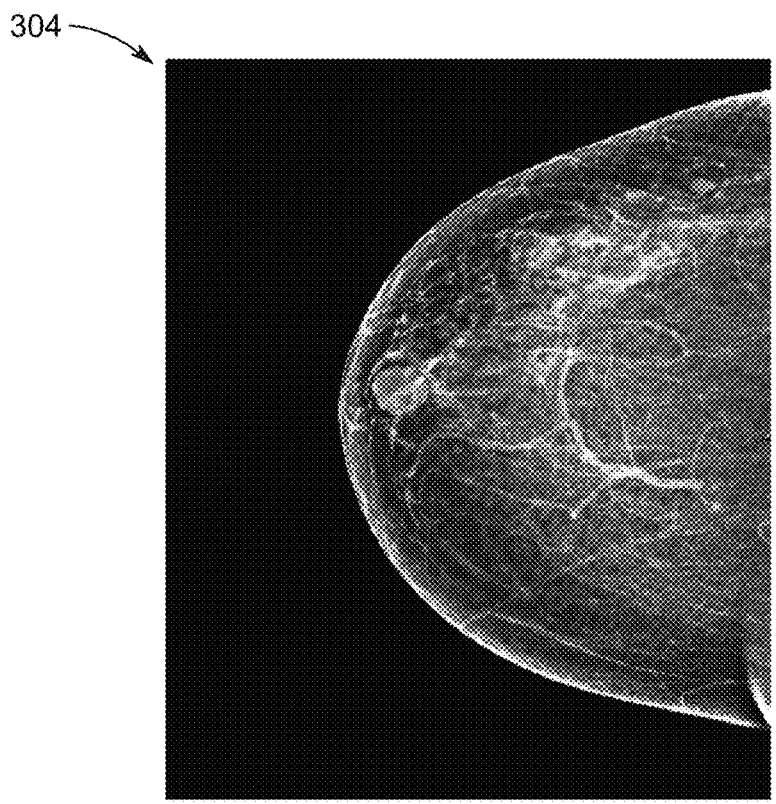
FIG. 3B illustrates an exemplary image of the mammograph image in a red channel, according to certain embodiments.
Figure 3C:
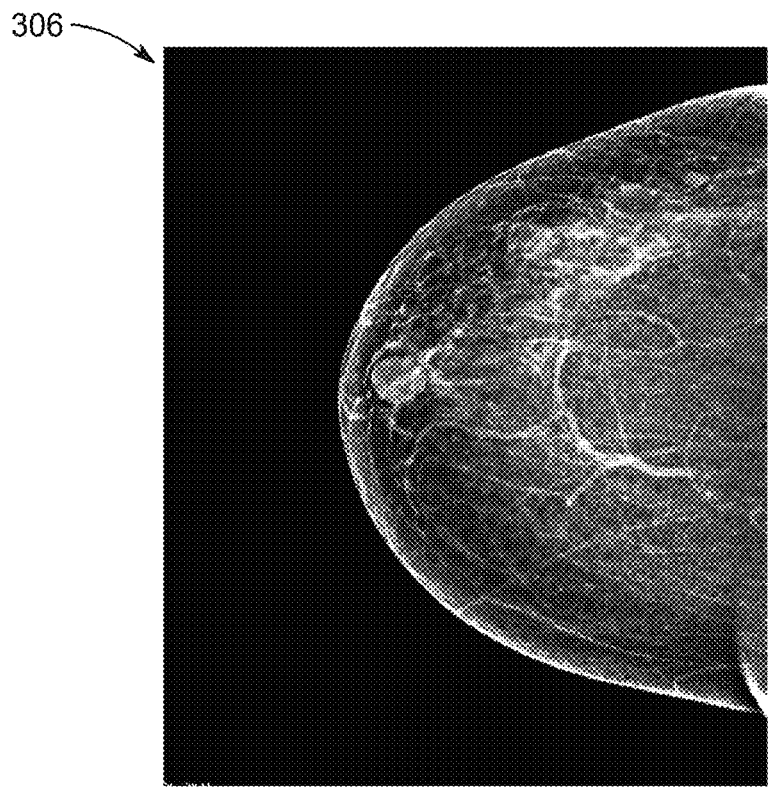
FIG. 3C illustrates an exemplary image of the mammograph image in a green channel, according to certain embodiments.
Figure 3D:
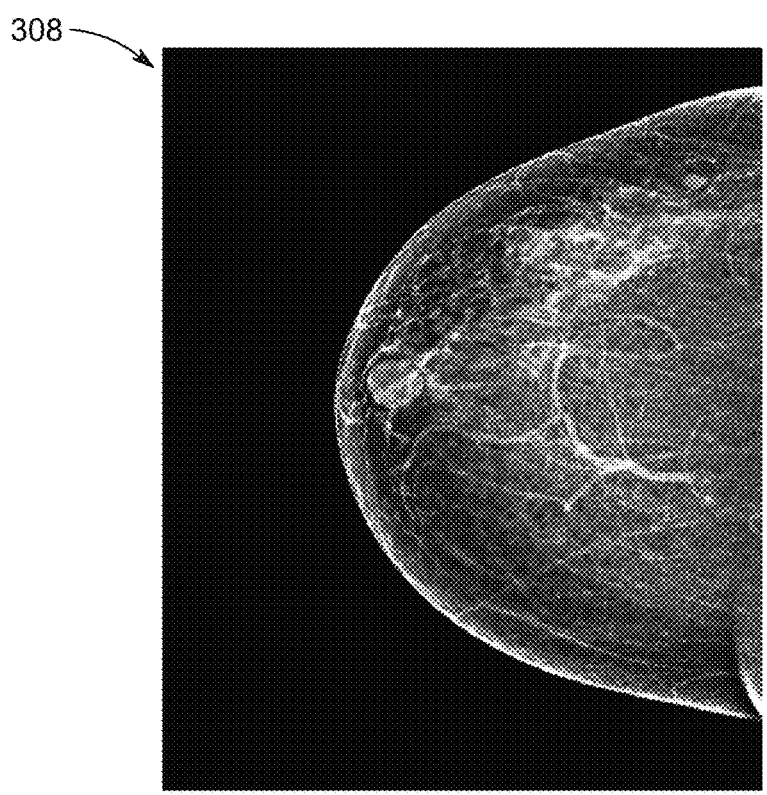
FIG. 3D illustrates an exemplary image of the mammograph image in a blue channel, according to certain embodiments.

FIG. 3A illustrates a digital mammograph image 302 (the input to be processed) for processing, according to certain embodiments. In an example, the digital mammograph image 302 is in JPEG format (RGB format). The digital mammograph image 302 is converted into three channels (red, green and blue), as shown in the FIG. 3B-FIG. 3D. In an aspect, the RGB (red, green and blue) format is one of the color formats for representing colored images. In the RGB format, the colored image contains 3 channels each for RGB color. In the RGB format, intensity values range from 0 to 255. Intensity 0 means dark red, green or blue color. As the intensity increases, the color fades and whiteness adds up. RGB intensity 0 represents black, and 1 represents white color.

Step 206 includes removing at least a portion of noise and uneven illumination from each of the three channel images to form a first set of three uniform background images. From each of the three channel images, at least a portion of the noise and uneven illumination are removed, and three uniform background images are generated. The three uniform background images are collectively known as the "first set of three uniform background images." At least 50% of the noise and uneven illumination is removed, preferable 60%, 70%, 80%, 90%, or 100%. In an aspect, the noise and uneven illumination is removed from each channel of the mammography images because the mammography modalities gave the images in X-ray format so that each channel looks like the original images. However, each channel has different imaging properties, so some details are more observable in one channel whereas in the other channel some details may be lost. For example, in some embodiments the red and blue channels contain more noise than the green channel. As a result, uniformity between channels helps to obtain well-contrasted mammography images for further processing for breast cancer diagnosis. Noise and uneven illumination in digital mammography images is due to two main reasons. Firstly, this happens due to the image acquisition process and secondly, the varying-low or non-uniform contrast leads to misclassification of pixels which leads to noise as well as uneven illumination in the image. Noise suppression renders true pixel distribution in mammography images and varying-low contrast correction renders uniform illumination in mammography images.

The uneven illumination and noise associated with the first set of three uniform background images can be eliminated by employing morphological techniques. As known, morphological image processing is a collection of non-linear operations related to the shape or morphology of features in the image. In an aspect, the morphological operations rely only on the relative ordering of pixel values, not on their numerical values, and therefore are especially suited to the processing of binary images. For example, the morphological operations can also be applied to greyscale images as their transfer functions are unknown, and therefore their absolute pixel values are of no or minor interest. In an operative aspect, the method 200 is configured to employ basic morphological tactics called a bottom-hat operation and a top-hat operation to remove background noise and make the image contrast uniform. The top-hat and bottom-hat operations (filtering techniques) are useful for enhancing details in the image if shading is present. These operations can be used to correct the effects of non-uniform illumination. In an aspect, the noise and uneven illumination are removed using the bottom-hat operation or the top-hat operation. In an aspect, the noise and uneven illumination are removed using the bottom-hat operation first, and then using the top-hat operation. It can be observed that there are variations of intensities in the image, especially in the region of the pectoral muscles. The intensity levels of the pectoral muscle vary significantly due to an abnormal region or cancerous region, and these intensity levels are significantly lower than the background intensity. In an example, scanning the cancerous area determines the presence of tiny nerves or vessels. The bottom-hat operation improves image analysis of such a region and provides more information to the image while lowering the noise level and observing the cancerous region. The mathematical representation of the top-hat operation $T_b(f)$ on image $f$ with structuring element b is defined in equation (1) as:

$$T_b(f) = f \cdot b - f, \quad (1)$$

where the "·" represents a closed or bottom hat operation on image $f$ with structuring element b. Then, the top-hat operation is applied to increase the contrast and control the change in contrast of the pectoral muscle or the cancerous region. The mathematical representation of the top-hat operation $T_w(f)$ on image $f$ with structuring element b is defined in equation (2) as:

$$T_w(f) = f - f \circ b, \quad (2)$$

where the "∘" represents an open or top-hat operation on image $f$ with structuring element b. An improved image is obtained with uneven illumination and noise suppression. Further description of top and bottom hat operations are provided in T. Chen, Q. H. Wu, R. Rahmani-Torkaman, J. Hughes, "A pseudo top-hat mathematical morphological approach to edge detection in dark regions", Pattern Recognition, Volume 35, Issue 1, 2002, Pages 199-210, and Soomro, T. A., Khan, M. A. U., Gao, J. et al. Contrast normalization steps for increased sensitivity of a retinal image segmentation method. SIViP 11, 1509-1517 (2017), both of which are hereby incorporated by reference in their entirety.

Step 208 includes separating a luminance channel and a chrominance channel from the first set of three uniform background images with a transfer function and forming a second set of three uniform background images. In an aspect, the first set of three uniform background images is processed with the transfer function. For example, the transfer function is a gamma function, or a perceptual quantizer (PQ) function, as further defined in "45.601-5 IRB: Studio Encoding Parameters of Digital Television for Standard 4:3 and Wide Screen 16:9 Aspect Ratios. 1995. Available online: https://www.itu.int/rec/R-REC-BT.601/ (accessed on 29 Dec. 2021)", incorporated herein by reference. The luminance channel and the chrominance channel are removed from the three uniform background images. For example, an image can also be represented by an YCbCr system. In the YCbCr system, the Y is known as the luminance channel. The luminance channel represents brightness within the image. The Cb and Cr are chrominance channels representing the color of the image. In an aspect, a digital noise in the chrominance channels is more objectionable to the human eye than noise in the luminance channel.

Step 210 includes applying the principal component analysis (PCA) to the second set of the three uniform background images to determine an eigenvalue and corresponding eigenvector. During an implementation of the technique of the present disclosure it was unexpectedly observed that the green channel gives better contrast and more detail on the pectoral muscle than the other two channels. The green channel has better histogram images that show good contrast distribution. However, there is still noise and uneven illumination due to the image acquisition process. The analysis of the other two channels can be eliminated because each of the three channels is converted into a single grayscale image using the PCA.

PCA is a dimensionality-reduction method that is often used to reduce the dimensionality of large data sets, by transforming a large set of variables into a smaller set of variables that includes most of the information of the large set. PCA can be summarized into five steps:

The first step includes standardization of continuous initial variables so that each variable contributes equally to the analysis.

The second step includes performing a covariance matrix computation, inter alia, to understand how the variables of an input data set vary from a mean value with respect to each other, or in other words, to see if there is any relationship between the variables.

The third step includes computing eigenvectors and eigenvalues of the covariance matrix to identify the principal components. The eigenvectors of the covariance matrix are actually the directions of the axes where there is the most variance (most information), also known as principal components. The eigenvalues are simply the coefficients attached to eigenvectors, which give the amount of variance carried in each principal component.

The fourth step includes determining a feature vector matrix. The eigenvectors are computed and placed in descending order according to their eigenvalues, thereby finding the principal components in order of significance. In the fourth step, the components with low eigenvalues are discarded and a matrix known as feature vector is formed with the remaining principal component.

The fifth step includes using the feature vector to rearrange the data from the original axes to the ones represented by the principal components.

Step 212 includes assembling a single grayscale image from a weight of the eigenvalues and corresponding eigenvectors and applying a first subspace projection. In an aspect, the step 212 also includes applying a second and/or third subspace projection. After the background uniformity of the channels and eliminating most of the nonuniform regions of the image, all the channels are combined to generate the single grayscale image. Color-to-gray conversion is adopted to combine all previously processed tricolor images with their respective non-uniform removal process. In the conventional methods, the green channel is selected for possible grayscale representation. However, in the method 200 all three channels are used with the help of PCA to obtain the grayscale image.

In an overall aspect of the present disclosure, the PCA technique is configured to convert the three channels to the grayscale image into three steps. The first step involves forming a vector color image ($I_{rgb} \in R^{3 \times n}$) by stacking three channels side by side. Then, a $I_{YCbcr}$ image ($I_{YCC} \in R^{3 \times n}$) is calculated from its original image to separate the luminance and chrominance channels using the conventional transfer function $f(\supseteq)$. In the second step, the eigenvalues $\lambda_1 \geq \lambda_2 \geq \lambda_3 \in R^1$ and their corresponding eigenvectors $v_1, v_2, v_3 \in R^3$ are projected by adopting the method of PCA. The final gray image $I_{gray} \in R^n$ is calculated by a weighted linear combination of three projections, where the weights are calculated as a percentage of their eigenvalues. The final output is scaled to [0,255]. Next, the first subspace projection is used, which dominates the color-gray mapping results due to its substantially larger eigenvalue. For example, the first subspace projection is a PCA projection, a Locally Linear Embedding (LLE) projection. In an aspect, the first subspace projection includes both PCA and Independent Component Analysis (ICA). The second and third subspace projections contribute a small proportion to the detail of the original three-channel image in the resulting grayscale image.

Figure 4:
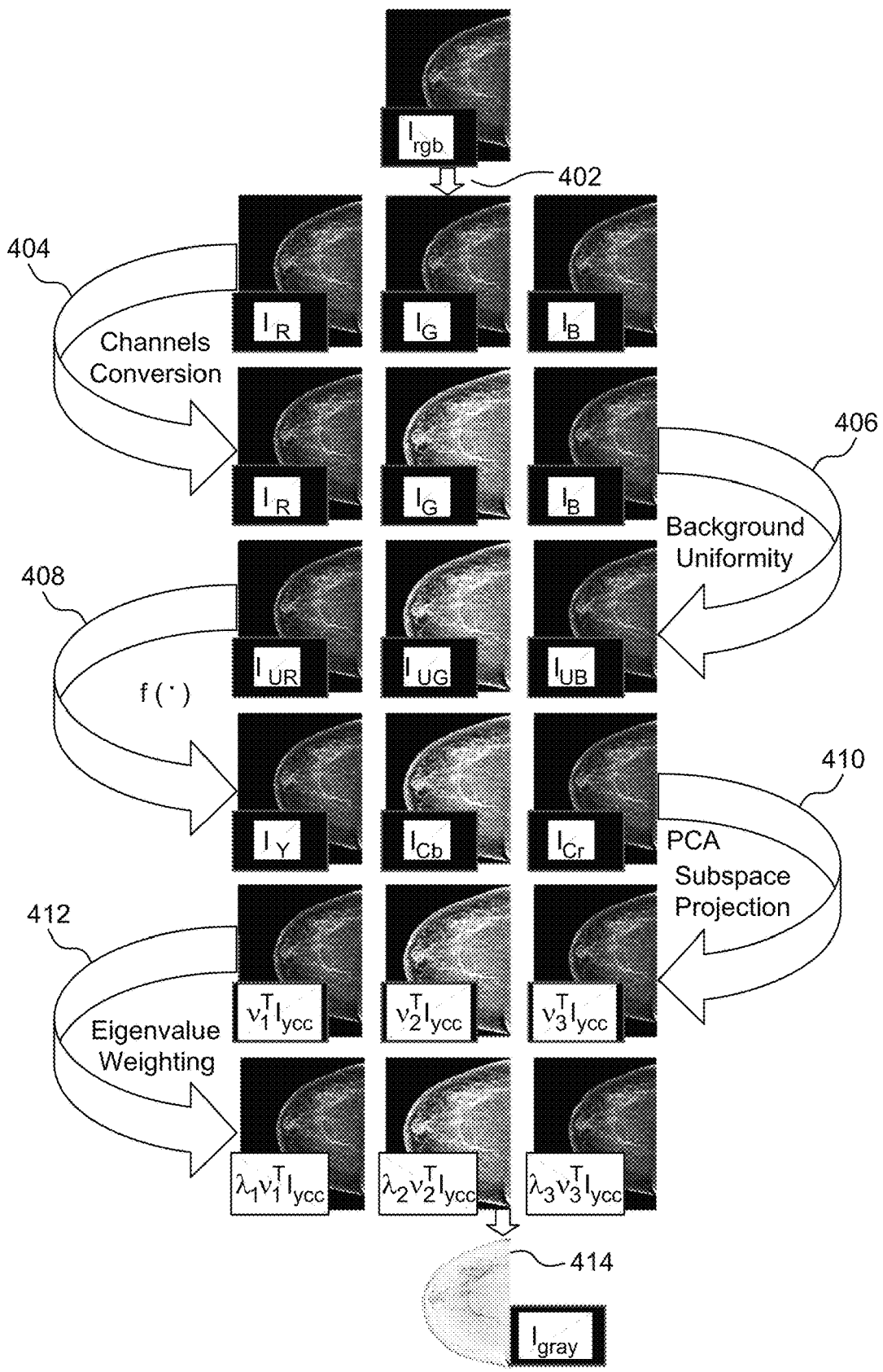
FIG. 4 illustrates a principal component analysis (PCA) based color-to-gray conversion process, according to certain embodiments.

In an embodiment, the steps 202-212 are shown in FIG. 4 with breast images. Step 402 includes receiving a digital mammography image (I rgb) of the breast from the computing device. In an aspect, the $I_{rgb}$ is processed to generate an enhanced image as an output.

Step 404 includes channel conversion of the digital mammography image into three channels, red $I_R$, green $I_G$, and blue $I_B$, to obtain three channel images.

Step 406 includes the removal of at least a portion of noise and uneven illumination from each of the three channel images. From each of the three channel images ($I_R$, $I_G$, and $I_B$), at least a portion of the noise and uneven illumination are removed, and three uniform background images are generated ($I_{UR}$, $I_{UG}$, and $I_{UB}$).

Step 408 includes performing the bottom-hat operation uniform on the background images ($I_{UR}$, $I_{UG}$, and $I_{UB}$). The step 408 further includes removing noise and uneven illumination and separating a luminance channel and a chrominance channel from the first set of three uniform background images. The luminance channel and the chrominance channel are removed from the three uniform background images, and the second set of three uniform background images ($I_Y$, $I_{Cb}$, and $I_{Cr}$) are generated.

Step 410 includes applying principal component analysis (PCA) to the second set of the three uniform background images ($I_Y$, $I_{Cb}$, and $I_{Cr}$) to determine an eigenvalue and corresponding eigenvector ($v_1{}^T I_{ycc}$, $v_2{}^T I_{ycc}$, and $v_3{}^T I_{ycc}$).

Step 412 includes weighting eigenvalue and generating three weighted eigenvalues ($\lambda_1 v_1{}^T I_{ycc}$, $\lambda_1 v_2{}^T I_{ycc}$, and $\lambda_1 v_3{}^T I_{ycc}$).

Step 414 includes assembling a single grayscale image by adding three weighted eigenvalues.

Figure 5:
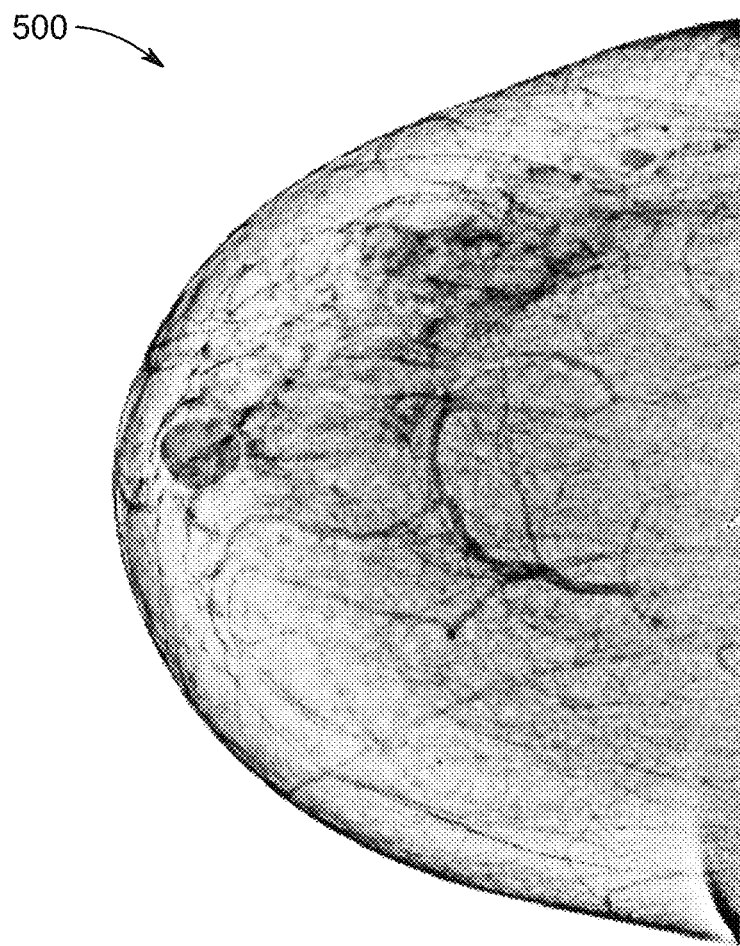
FIG. 5 illustrates a breast image after removal of pectoral muscles, according to certain embodiments.

Step 214 includes removing at least a portion of the pectoral muscle from the grayscale image with a seed region growth technique to obtain a muscle removed image. In an embodiment, at least 50% of the pectoral muscle is removed, preferably 60%, 70%, 80%, 90%, or 100%. The seed region growth technique is configured to shrink the pectoral muscle to get a clearer image of the breast. The breast is the region of interest in the mammogram images, as it would contain the cancerous region. The seed region growth technique is one method of image segmentation, and it contains two operating principles. One principle is based on selecting a pixel location value, and the other principle is selecting a seed point. In an aspect, the seed point in the seed region growth technique is selected by using neighboring pixels of the seed point and determining whether subsequent pixels should be added to the region or not. This process is continuous and iterative until the segmentation of the region of interest. In an aspect, the step 214 also includes repeating the determining whether the subsequent pixels should be added to the region or not until at least 90% of the pectoral muscle is removed, preferably 92%, 94%, 96%, 98% or 100%. The seed region growth technique is configured to give an accurate selection based on the orientation of the image. In the method 200, the seed point is automatically selected considering the orientation of the mammographic image. FIG. 5 illustrates a final breast image 500 after the removal of the pectoral muscles, according to certain embodiments.

Step 216 includes normalizing the muscle removed image using a second order Gaussian Laplacian (LoG) and an oriented diffusion filter to form a processed image. The prior art focuses on the segmentation of the abnormal region without considering the coherency of the abnormal region or the coherency of the mammogram images. However, the method 200 implements that the coherency of mammography images increases visualization and facilitates segmentation of abnormal regions, leading to the classification of breast cancers. The method 200 is configured to use an oriented diffusion filtering such as LoG. More coherent images lead to more precise segmentation of the cancerous region from the mammography images. The oriented diffusion filter is applied for identifying coherent areas of low contrast region, as it is a suitable filtering method for normalized regions with low contrast. The oriented diffusion filter requires a recomputed orientation data of the image in advance, and this orientation data is called the orientation field (OF).

The orientation field makes a diffusion tensor imaging with the flow of the pixels of the image. In an aspect, an anisotropic diffusion procedure is used. The anisotropic diffusion procedure reduces image noise without removing significant parts of the image content, typically edges, lines or other details that are important for the interpretation of the image. The anisotropic diffusion procedure is based on the tilt angle of the best ellipse. The second order gaussian detector gives a right direction for the low contrast region. The anisotropic diffusion procedure is defined as follows:

1. Calculate a second moment matrix for each pixel.
2. Create a diffusion matrix for each pixel.
3. Calculate a change in intensity for each pixel as $\nabla(D\nabla I)$, where D is 2×2 diffusion matrix and I is the image entered in the process.
4. Update the image using the diffusion equation as follows:

$$I^{t+\Delta t} = I^t + \Delta t \times \nabla(D\nabla I). \quad (3$$

In an aspect, the anisotropic diffusion procedure is an iterative algorithm that processes the pixels from the initial mammography images to develop a smoother structure with each step. Step 216 is configured to provide a fine structure along with a normalized image, therefore there should be an appropriate stop criterion to get the fine structure. In an aspect, the stop criterion is a practical test that determines when to stop the iterative algorithm. The stop criterion would measure the distance of the last iterate to the true solution. The stop iteration process of the stop criterion is based on the rate of change of the spatial entropy value of the image relative to the number of iterations.

Figure 6A:
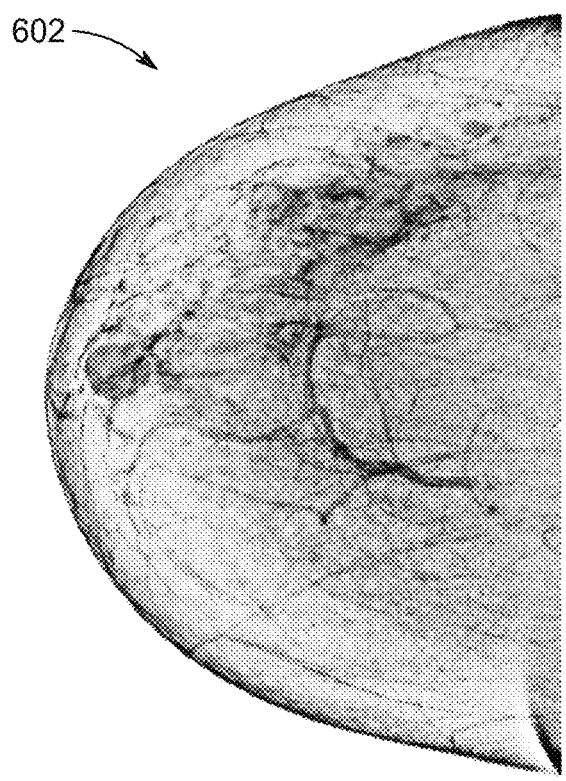
FIG. 6A illustrates a second order Laplacian of Gaussian output image, according to certain embodiments.
Figure 6B:
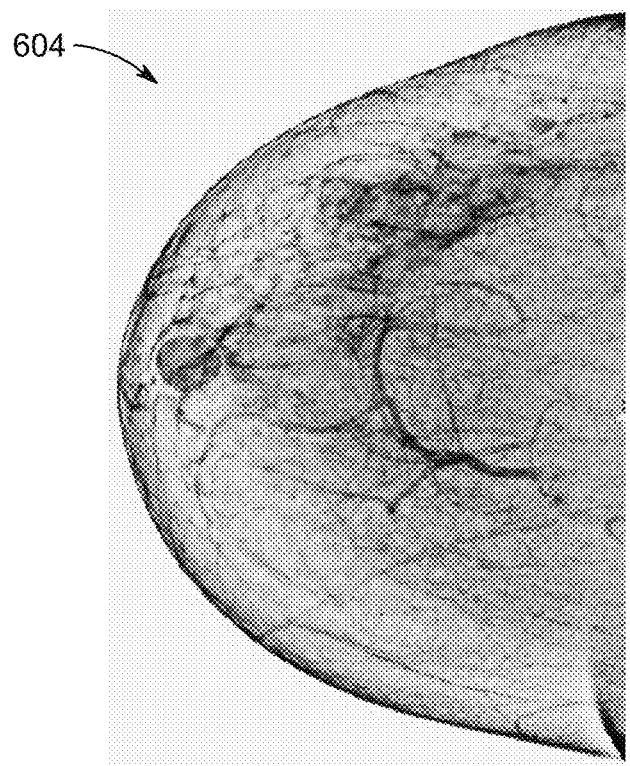
FIG. 6B illustrates an anisotropic-oriented diffusion filter image, according to certain embodiments.
Figure 7:
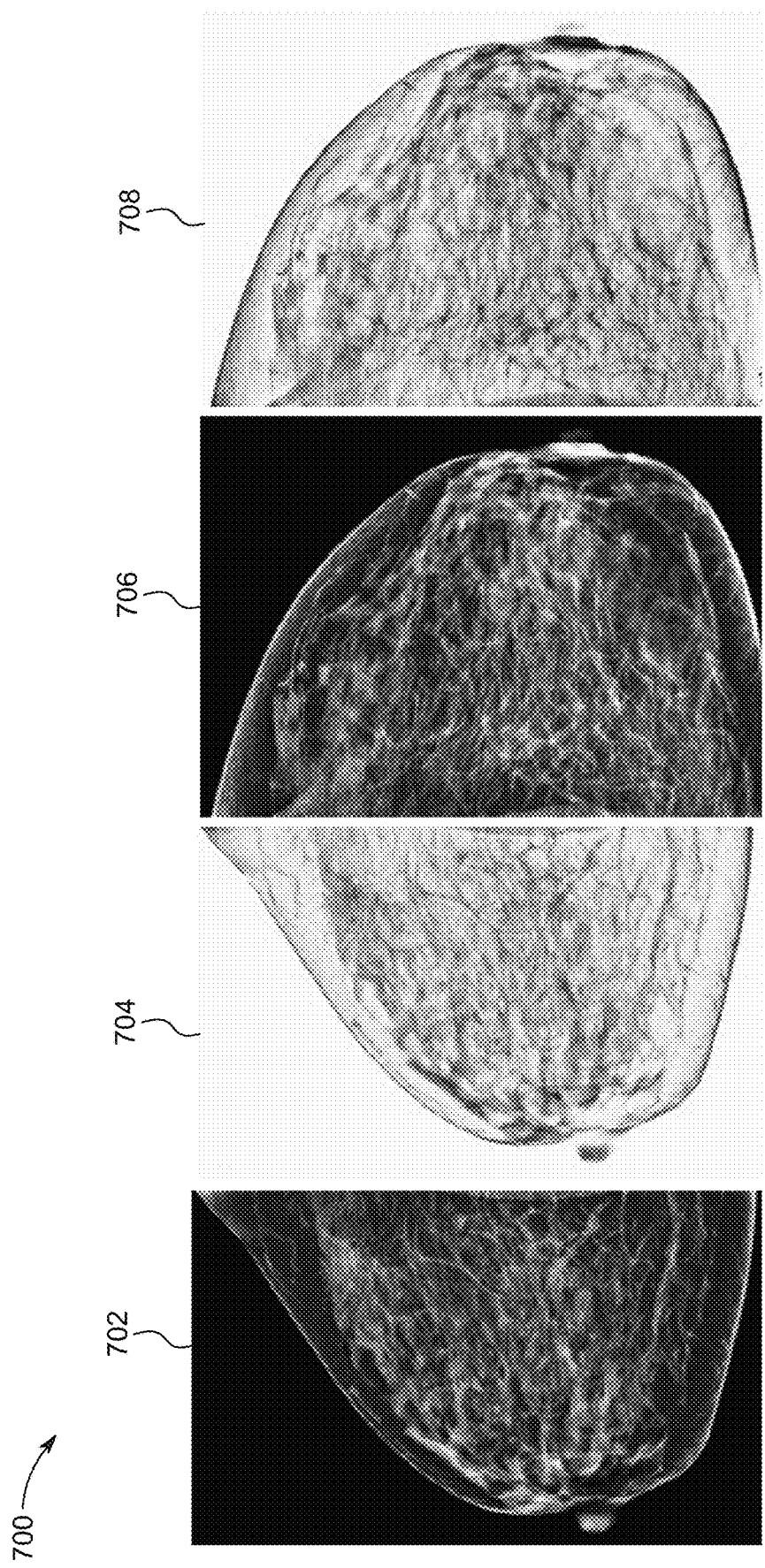
FIG. 7 represents CC views 700 of breast imaging-reporting and data system assessment category 1 (BI-RADS-1) mammogram images, according to certain embodiments. Image 702 represents the CC view of the BI-RADS-1 mammogram image of the left breast taken as the input image. Image 704 represents the CC view of the BI-RADS-1 mammogram image of the left breast after applying the method 200. Image 706 represents the CC view of the BI-RADS-1 mammogram image of the right breast taken as the input image. Image 708 represents the CC view of the BI-RADS-1 mammogram image of the right breast after applying the method 200.
Figure 8:
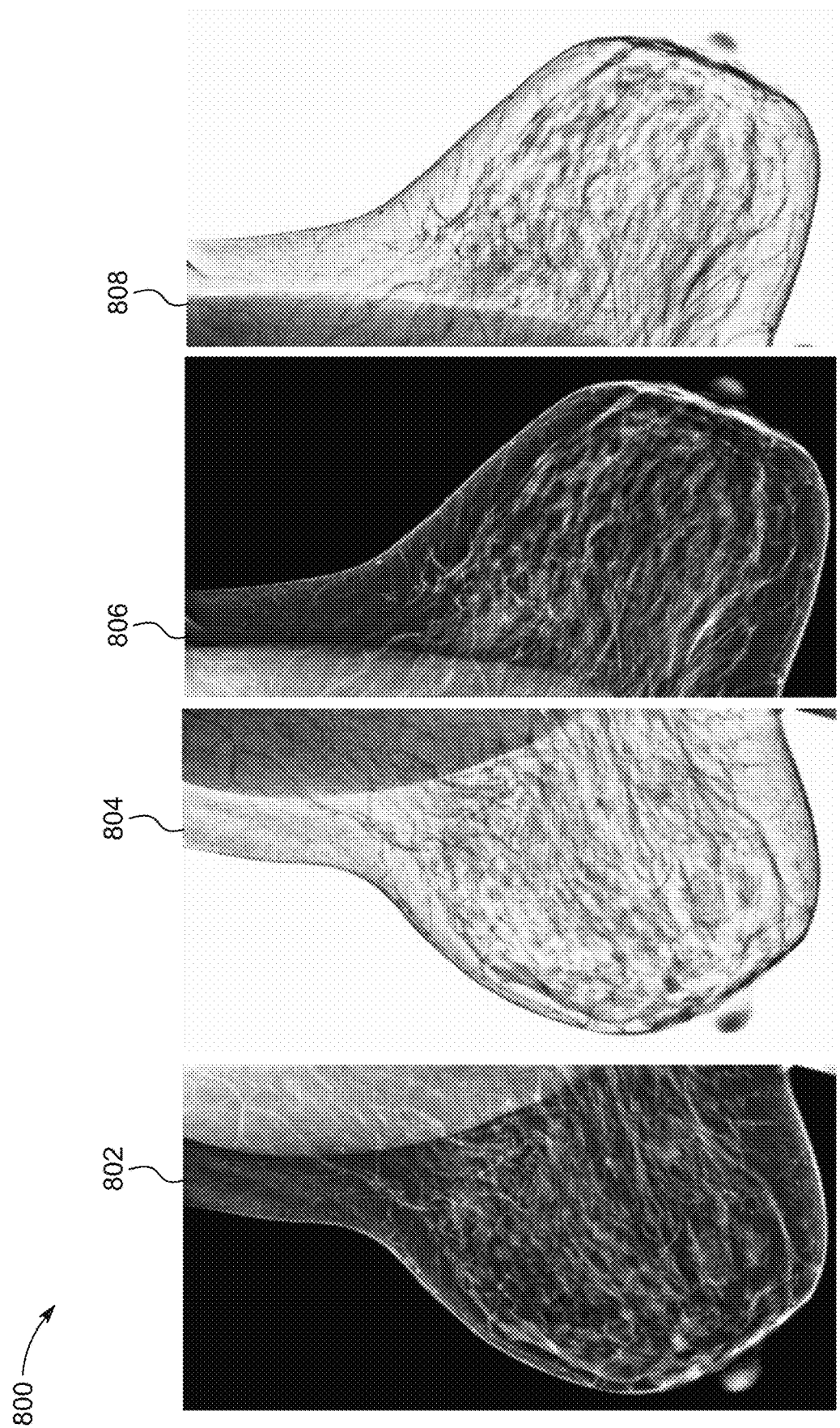
FIG. 8 represents MLO views 800 of BI-RADS-1 mammogram images, according to certain embodiments. Image 802 represents the MLO view of the BI-RADS-1 mammogram image of the left breast taken as the input image. Image 804 represents the MLO view of the BI-RADS-1 mammogram image of the left breast after applying the method 200. Image 806 represents the MLO view of the BI-RADS-1 mammogram image of the right breast taken as the input image. 808 represents the MLO view of the BI-RADS-1 mammogram image of the right breast after applying the method 200.
Figure 9:
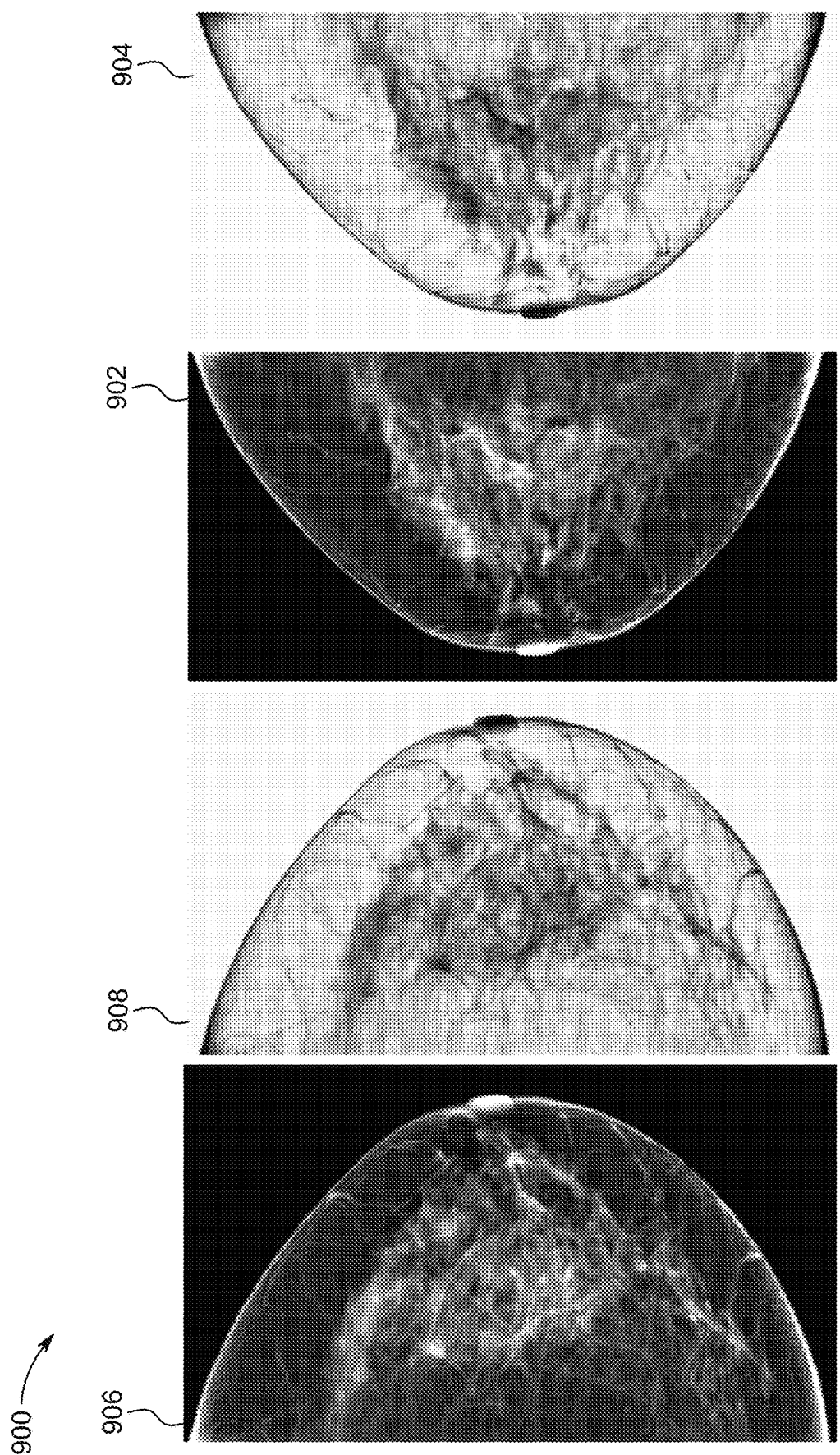
FIG. 9 represents a CC view 900 of breast imaging-reporting and data system assessment category 2 (BI-RADS-2) mammogram images, according to certain embodiments. Image 902 represents the CC view of the BI-RADS-2 mammogram image of the left breast taken as the input image. Image 904 represents the CC view of the BI-RADS-2 mammogram image of the left breast after applying the method 200. 906 represents the CC view of the BI-RADS-2 mammogram image of the right breast taken as the input image. Image 908 represents the CC view of the BI-RADS-2 mammogram image of the right breast after applying the method 200.
Figure 10:
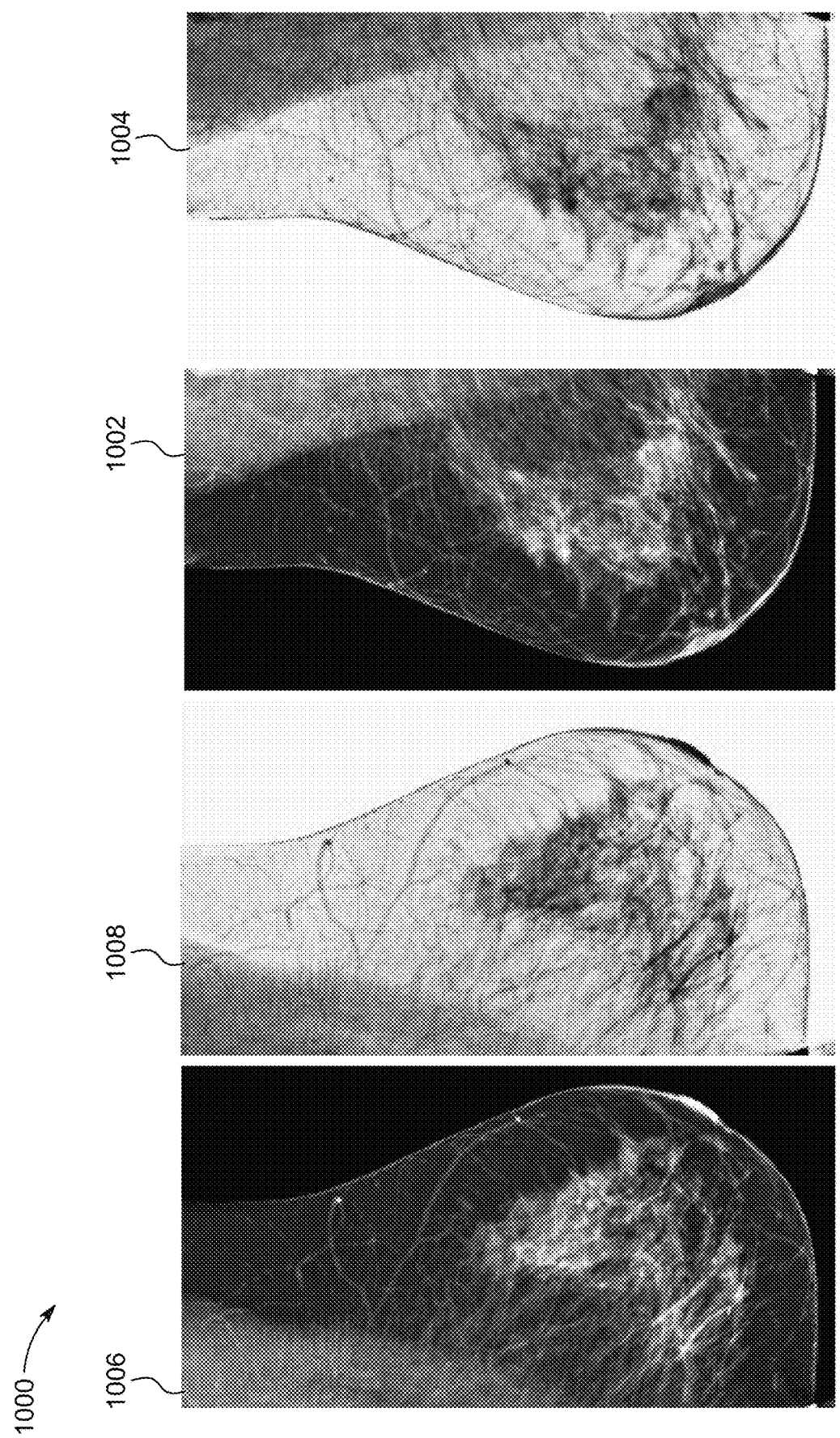
FIG. 10 represents MLO views 1000 of BI-RADS-2 mammogram images, according to certain embodiments. Image 1002 represents the MLO view of the BI-RADS-2 mammogram image of the left breast taken as the input image. Image 1004 represents the MLO view of the BI-RADS-2 mammogram image of the left breast after applying the method 200. Image 1006 represents the MLO view of the BI-RADS-2 mammogram image of the right breast taken as the input image. Image 1008 represents the MLO view of the BI-RADS-2 mammogram image of the right breast after applying the method 200.
Figure 11:
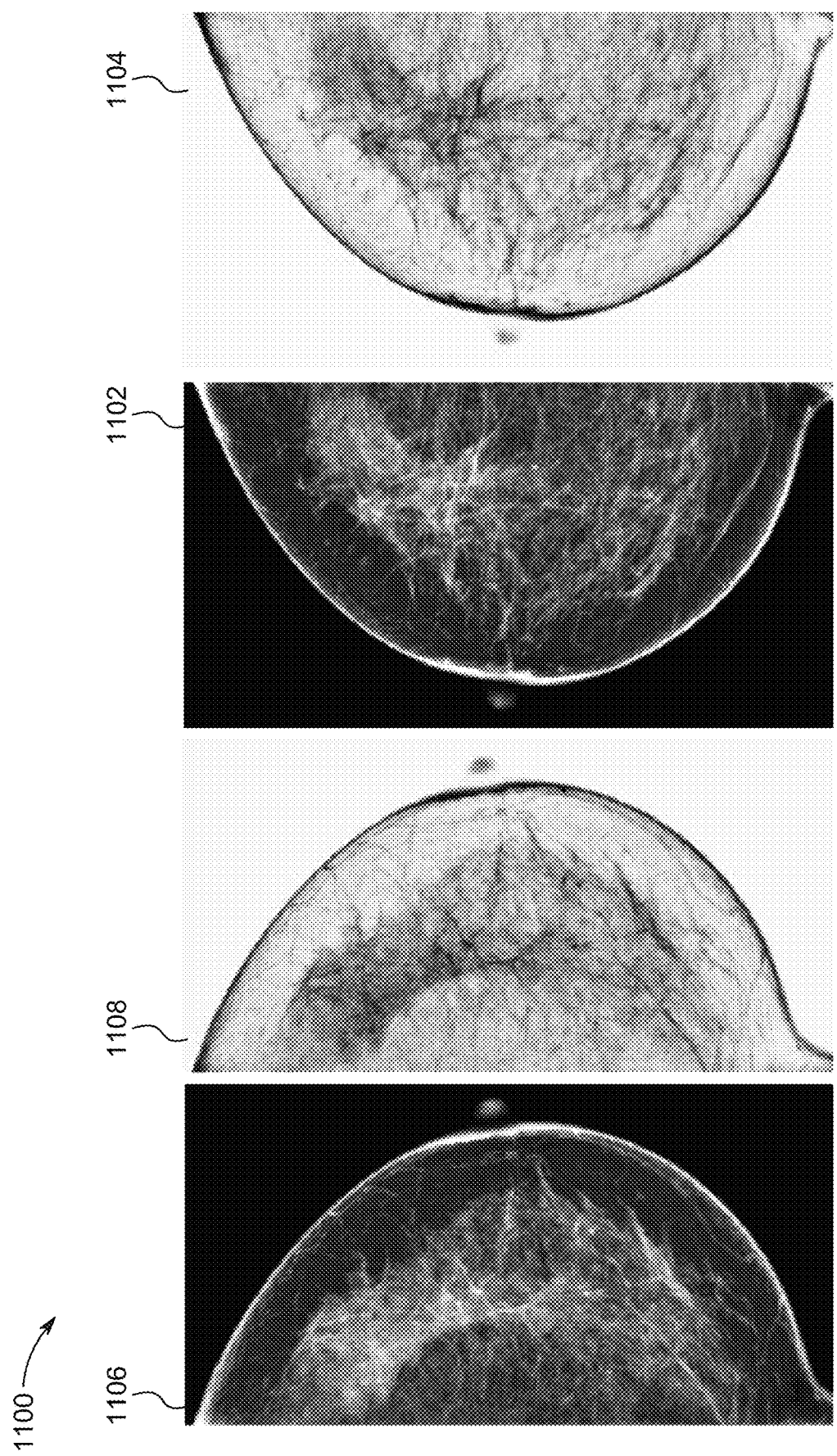
FIG. 11 represents the CC views 1100 of breast imaging-reporting and data system assessment category 3 (BI-RADS-3) mammogram images, according to certain embodiments. Image 1102 represents the CC view of the BI-RADS-3 mammogram image of the left breast taken as the input image. Image 1104 represents the CC view of the BI-RADS-3 mammogram image of the left breast after applying the method 200. Image 1106 represents the CC view of the BI-RADS-3 mammogram image of the right breast taken as the input image. Image 1108 represents the CC view of the BI-RADS-3 mammogram image of the right breast after applying the method 200.
Figure 12:
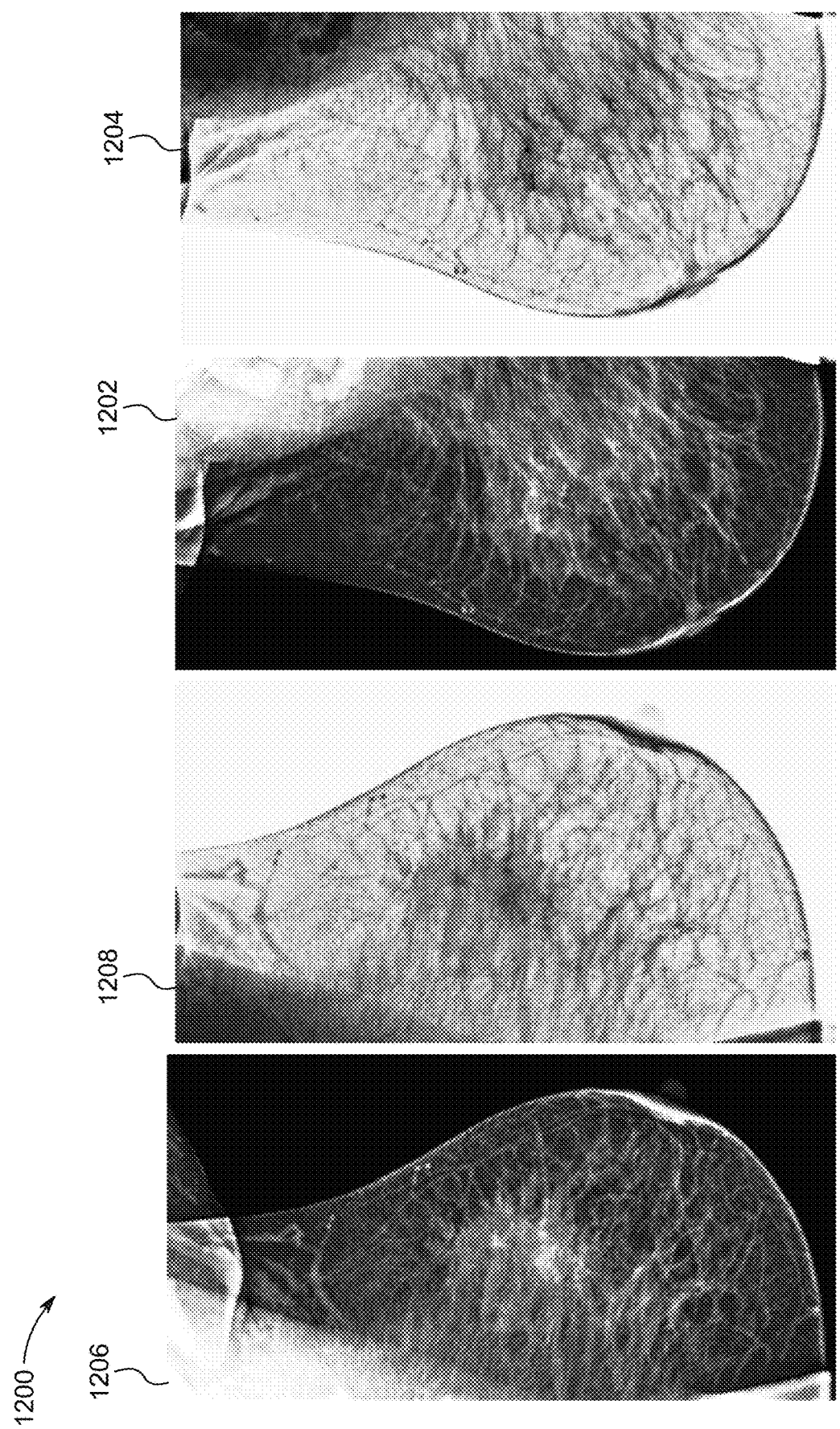
FIG. 12 represents MLO views 1200 of BI-RADS-3 mammogram images, according to certain embodiments. Image 1202 represents the MLO view of the BI-RADS-3 mammogram image of the left breast taken as the input image. Image 1204 represents the MLO view of the BI-RADS-3 mammogram image of the left breast after applying the method 200. Image 1206 represents the MLO view of the BI-RADS-3 mammogram image of the right breast taken as the input image. Image 1208 represents the MLO view of the BI-RADS-3 mammogram image of the right breast after applying the method 200.
Figure 13:
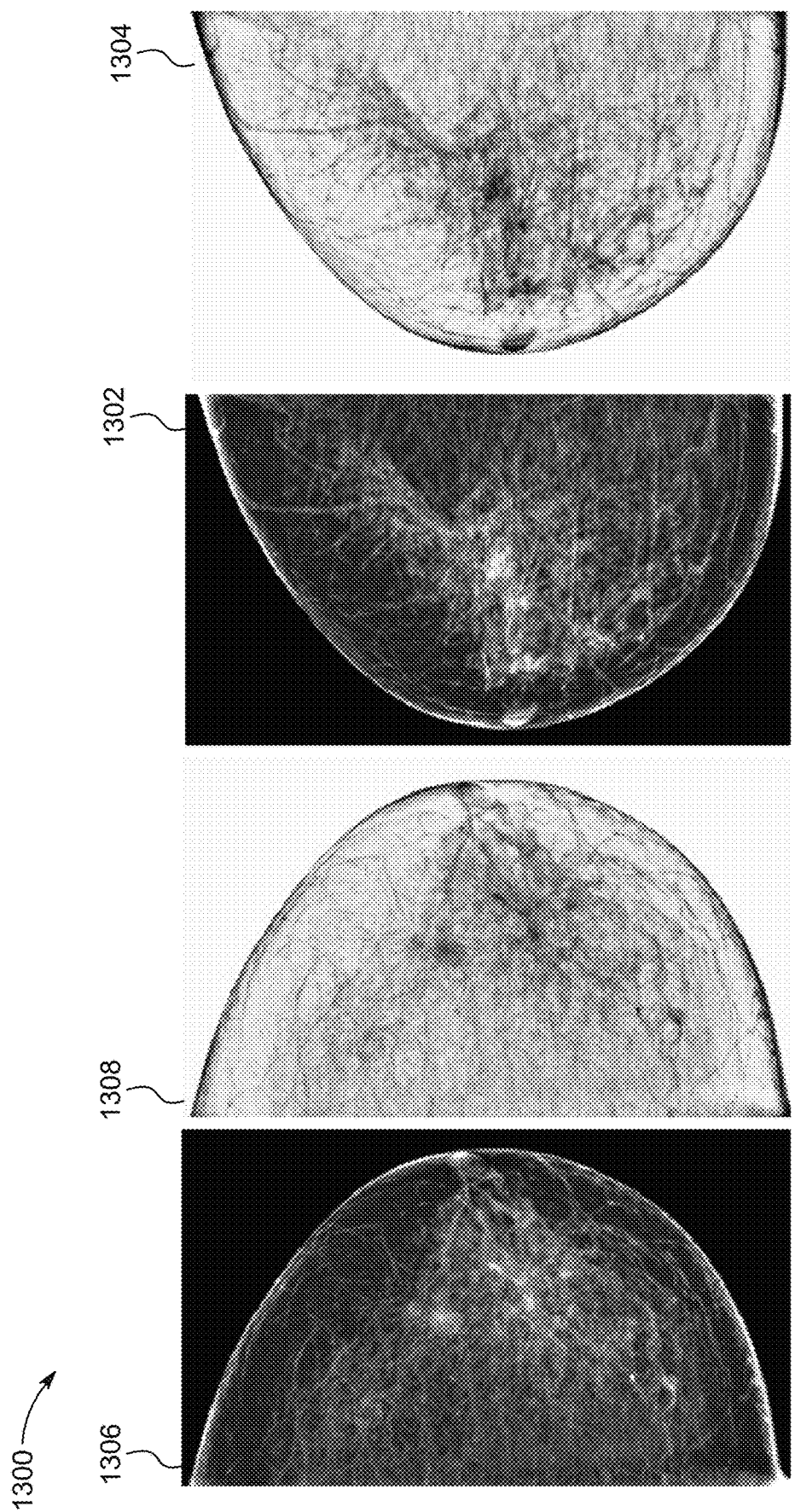
FIG. 13 represents CC views 1300 of breast imaging-reporting and data system assessment category 4 (BI-RADS-4) mammogram images, according to certain embodiments. Image 1302 represents the CC view of the BI-RADS-4 mammogram image of the left breast taken as the input image. Image 1304 represents the CC view of the BI-RADS-4 mammogram image of the left breast after applying the method 200. Image 1306 represents the CC view of the BI-RADS-4 mammogram image of the right breast taken as the input image. Image 1308 represents the CC view of the BI-RADS-4 mammogram image of the right breast after applying the method 200.
Figure 14:
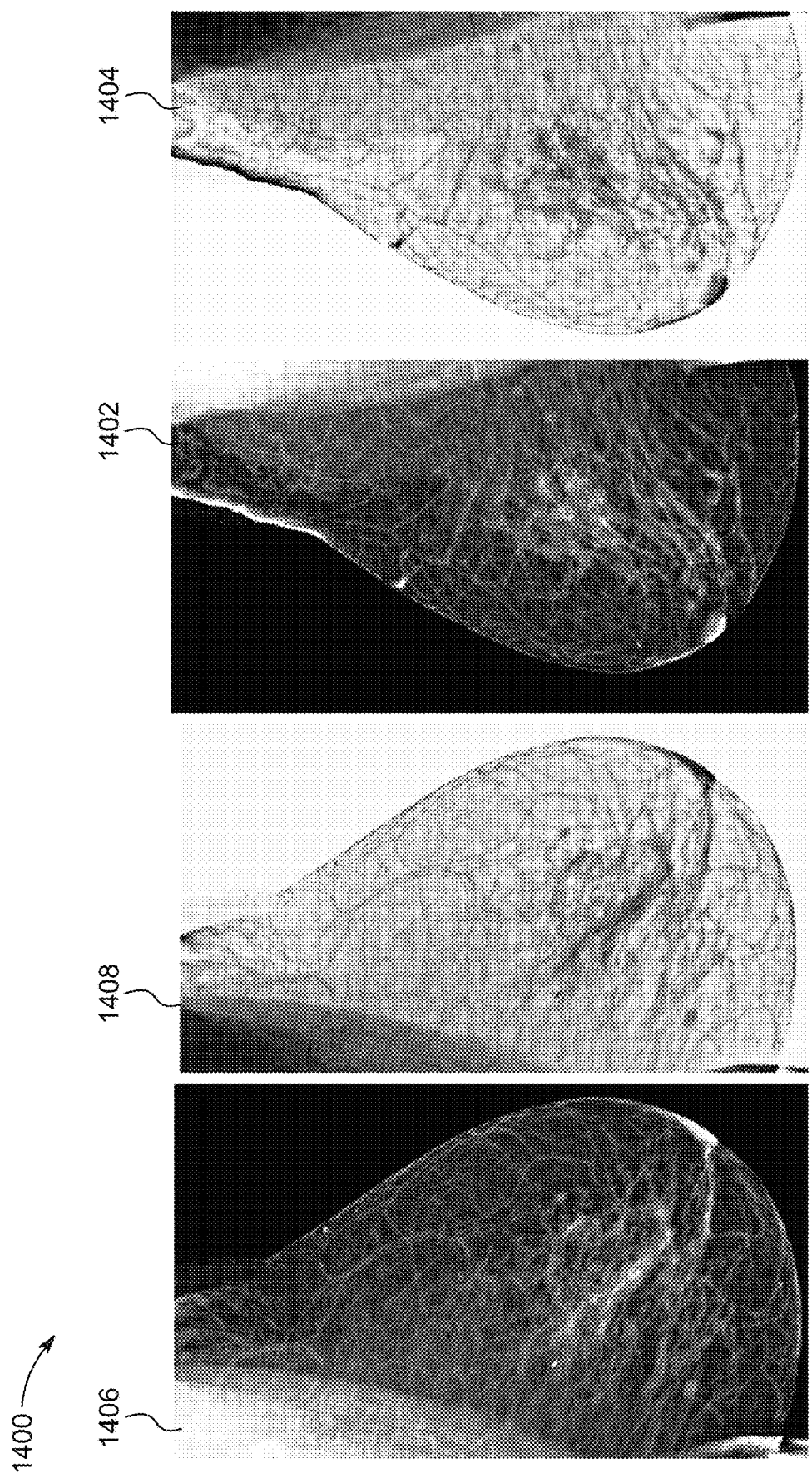
FIG. 14 represents MLO views 1400 of BI-RADS-4 mammogram images, according to certain embodiments. Image 1402 represents the MLO view of the BI-RADS-4 mammogram image of the left breast taken as the input image. Image 1404 represents the MLO view of the BI-RADS-4 mammogram image of the left breast after applying the method 200. Image 1406 represents the MLO view of the BI-RADS-4 mammogram image of the right breast taken as the input image. Image 1408 represents the MLO view of the BI-RADS-4 mammogram image of the right breast after applying the method 200.
Figure 15:
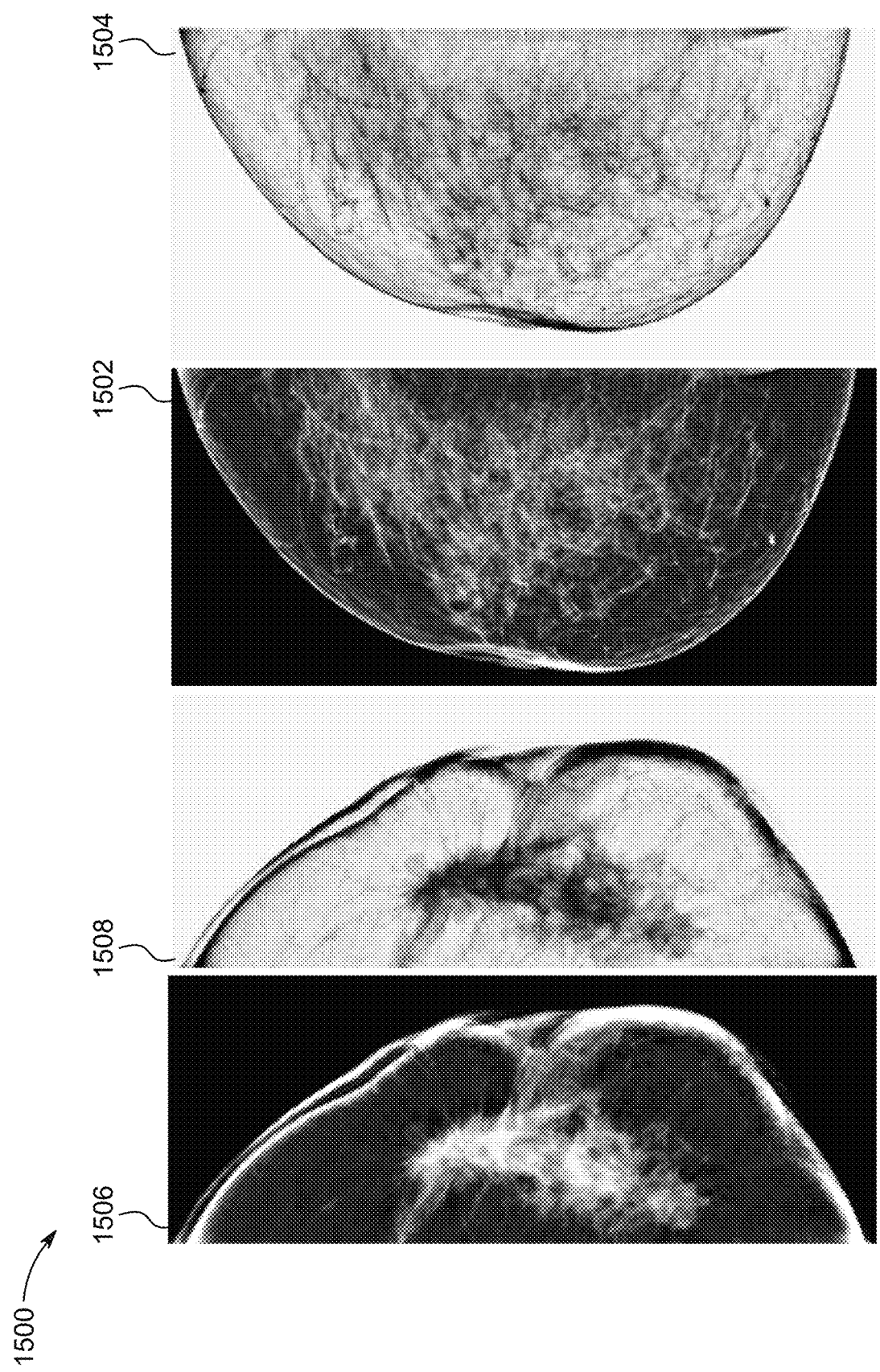
FIG. 15 represents CC views 1500 of breast imaging-reporting and data system assessment category 5 (BI-RADS-5) mammogram images, according to certain embodiments. Image 1502 represents the CC view of the BI-RADS-5 mammogram image of the left breast taken as the input image. Image 1504 represents the CC view of the BI-RADS-5 mammogram image of the left breast after applying the method 200. Image 1506 represents the CC view of the BI-RADS-5 mammogram image of the right breast taken as the input image. Image 1508 represents the CC view of the BI-RADS-5 mammogram image of the right breast after applying the method 200.
Figure 16:
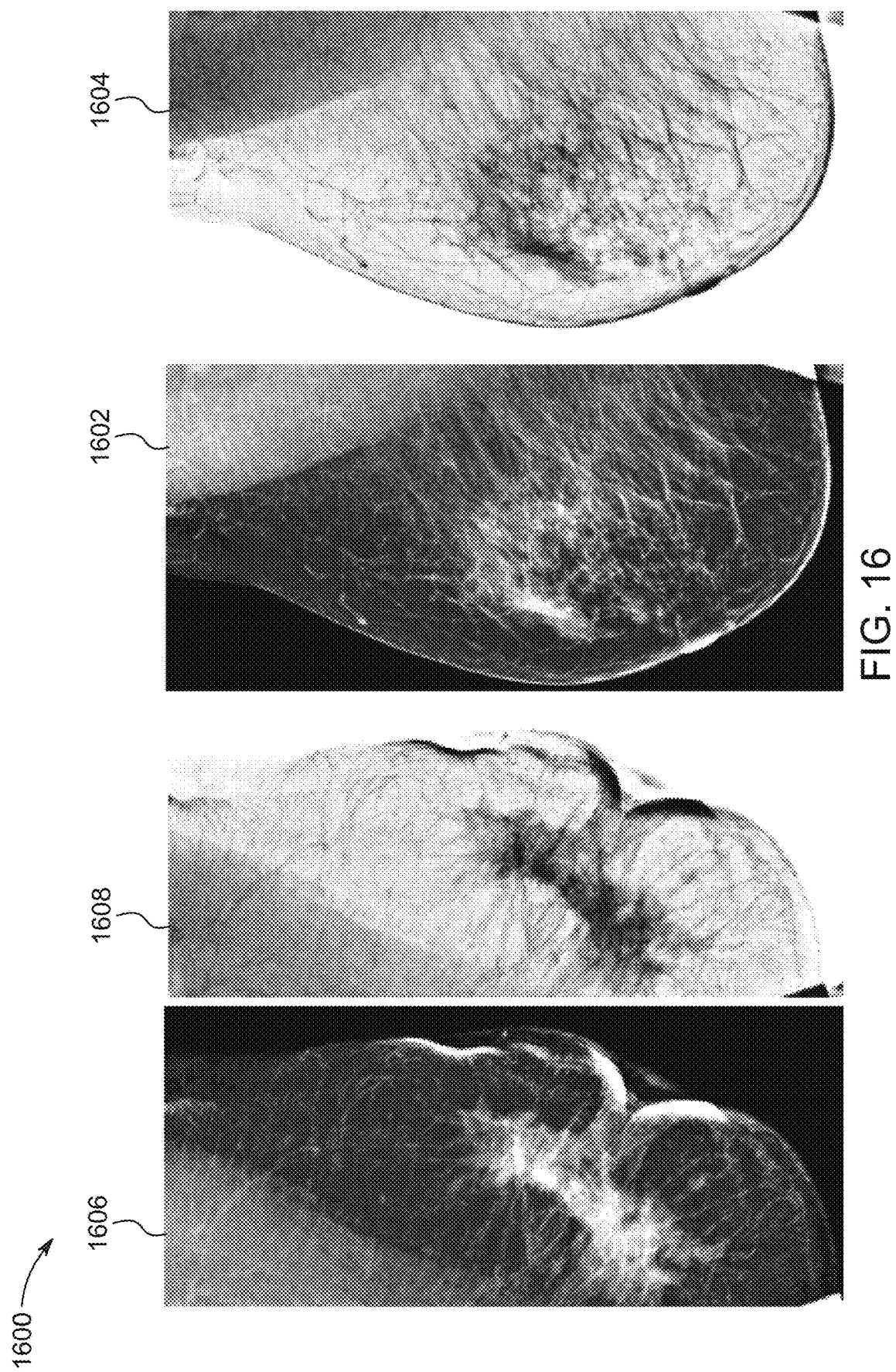
FIG. 16 represents the MLO views 1600 of BI-RADS-5 mammogram images, according to certain embodiments. Image 1602 represents the MLO view of the BI-RADS-5 mammogram image of the left breast taken as the input image. Image 1604 represents the MLO view of the BI-RADS-5 mammogram image of the left breast after applying the method 200. Image 1606 represents the MLO view of the BI-RADS-5 mammogram image of the right breast taken as the input image. Image 1608 represents the MLO view of the BI-RADS-5 mammogram image of the right breast after applying the method 200.

FIG. 6A illustrates a second-order Laplacian of Gaussian output image 602, according to certain embodiments. FIG. 6B illustrates an anisotropic oriented diffusion filter image 604, according to certain embodiments. From FIG. 6B, it can be observed that the anisotropic oriented diffusion filter gives more coherence to the images in particular area, especially the area of the breast concerning the background compared to the Gaussian second order filter.

Step 218 includes identifying a cancerous region and/or a noncancerous region in the processed image and diagnosing the patient. In an aspect, step 218 further includes identifying the cancerous region in the processed image and diagnosing the patient with cancer, and excising the cancerous region from the breast of the patient. In an aspect, step 218 further includes identifying the cancerous region in the processed image and diagnosing the patient with cancer, and performing a mastectomy on the patient. In an aspect, step 218 further includes identifying the cancerous region in the processed image and diagnosing the patient with cancer, and treating the patient with at least one method selected from the group consisting of chemotherapy, immunotherapy, targeted therapy, radiation therapy, and/or hormonal therapy.

In an aspect, the processed image has a signal to noise ratio of at least 30, preferably 40, 50, 60, 70, 80, 90, or 100.

In an example, the contrast of the image is increased by at least 50%, preferably 60%, 70%, 80%, 90%, or 100% compared to the same mammogram image without the processing described herein.

In an aspect, the effective measure of enhancement of the image is increased by at least 40%, preferably 50%, 60%, 70%, 80%, 90%, or 100% compared to the same mammogram image without the processing described herein.

In an aspect, the method 200 has an accuracy of detecting a cancerous region of at least 95%, preferably 96%, 97%, 98%, 99%, or 100%.

In an aspect, the processing of the mammogram image has an average duration of 1-60 seconds, preferably less than 50 s, 40 s, 30 s, 20 s, or 10 s.

In an operative aspect, the present disclosure discloses the different steps to improve the contrast of the image in terms of visual perception, noise reduction as well as contrast enhancement. The method 200 is configured to generate a well-contrasted image and also employ coherence filtering to obtain a well-normalized image. The objective of the present disclosure is to aid the post-processing steps of any image processing method or machine learning method. The method 200 can also be used to improve the performance of a deep learning-based method for breast cancer, as it can be used as an input technique for the training process. In an aspect, the method 200 improves the training process of the machine learning method, and it also improves the performance of traditional methods when used as a pre-treatment module.

EXAMPLES

The following examples are provided to illustrate further and to facilitate the understanding of the present disclosure.

In the present disclosure, for experimentation, the data was collected from different hospitals in Qassim health cluster, Qassim province, Saudi Arabia hospital, to build a database known as Qassim Health Cluster Database. The database (Qassim Health Cluster Database) contains 11,194 mammogram images, and the database is categorized according to the Breast Imaging Data and Reporting System (BI-RADS). The number of images in the database is shown in the Table 2. For validating the image enhancement technique, 100 images from each category of BI-RADS were used, and 100 images from negative cases or BI-RADS-1 were used.

TABLE 2

Database information

| Category | Number of Images |
|---|---|
| BI-RADs-1 | 996 |
| BI-RADs-2 | 817 |
| BI-RADs-3 | 371 |
| BI-RADs-4 | 452 |
| BI-RADs-5 | 256 |

During the experimentation, a Mammographic Image Analysis Society (MIAS) database was also used. The MIAS was created by British research groups with the aim of understanding images from mammograms. The MIAS includes mammography images taken from the UK National Breast Screening Programme. The images are digitized at 50 microns of pixel edge with a Joyce-Loebl scanning microdensitometer, a linear device in the 0-3.2 optical density range and representing each pixel with an 8-bit word. The MIAS database contains 322 digitized images of 161 pairs. The MIAS database has been reduced to a 200 micron pixel edge and padded so that all images are 1024×1024.

The disclosed method 200 was evaluated based on various parameters such as contrast enhancement, noise reduction and unwanted artifacts. In an aspect, the three parameters were calculated to know the effectiveness of the method 200 for mammography images, listed as below:
1) Peak signal to noise ratio (PSNR);
2) Image contrast; and
3) Effective measure of enhancement (EME).

Example 1: Calculating PSNR

There are many processes to calculate PSNR, but it was observed during experimentation that the value of PSNR is based on the mean square estimation (MSE). First, the MSE (as shown in the Equation (5)) of the image tracks was calculated, and the calculated MSE was used to calculate the PSNR (as shown in the equation). The PSNR is widely used to calculate the quality of images between the original image and the output image in terms of noise reduction. A large value of PSNR means that the image has less noise compared to the original image.

$$MSE = \frac{1}{MN} \sum_m \sum_n |X(m,n) - Y(m,n)|^2; \qquad (4)$$

$$PSNR = 10\log_{10}\left[\frac{(L-1)}{MSE}\right], \qquad (5)$$

where X(m,n) and Y(m,n) are the gray level of input and output image at pixels positions of (m,n). The L is the maximum pixels value of image, and it would be 255 of 8-bit pixels image [L=$2^n$−1=$2^8$−1=256−1=255]. PSNR is measured in decibels (dB).

Example 2: Calculating Image Contrast

The image contrast gives information about the contrast enhancement and was calculated using the Equation (6), where M and N represent the width and height of the image, respectively. The higher the contrast value, the better the image information. Taking the logarithm of contrast is converting it to decibel unit (dB), as shown in the Equation (7).

$$C_{contrast} = \frac{1}{MN}\sum_{m=1}^{M}\sum_{n=1}^{N} Y^2(m,n) - \left|\frac{1}{MN}\sum_{m=1}^{M}\sum_{n=1}^{N} Y(m,n)\right|^2 \qquad (6)$$

$$C_{contrast} = 10\log_{10} C_{contrast}. \qquad (7)$$

Example 3: Calculating EME

The EME is a quantitative measure of image enhancement, and it gives information about the contrast of each image block and was calculated using the Equation (8). Where $K_1$ and $K_2$ are the numbers of horizontal and vertical blocks in the enhanced image, respectively, and $I_{max}(k,l)$ and $I_{min}(k,l)$ are the image blocks' maximum and minimum pixel values, respectively.

$$EME = \frac{1}{K_1 K_2} \sum_{L=1}^{K_2} \sum_{K=1}^{K_1} 20\log\left(\frac{I_{max}(k,l)}{I_{min}(k,l)}\right). \tag{8}$$

During the experimentation, the PSNR, the image contrast, and the EME of each category of databases were also measured. Further, the image in terms of visual observation was also analyzed. Table 3 shows the performance of the method 200. It is evident from the Table 3 that the method 200 has improved PSNR, contrast, and EME. Further, the method 200 can work on every category of BI-RADS. As many existing techniques do not work on higher grade BI-RADS due to the complexity, and the images are not of good quality.

TABLE 3

Performance of the method 200 on the database of mammography images.

| Category of BI-RADS | Without Image Enhancement | | | With Image Enhancement | | |
|---|---|---|---|---|---|---|
| | PSNR | Contrast | EME | PSNR | Contrast | EME |
| BI-RADs-1 | 28.13 | 45.13 | 5.12 | 32.48 | 71.87 | 8.16 |
| BI-RADs-2 | 27.21 | 42.26 | 4.95 | 31.25 | 67.81 | 7.42 |
| BI-RADs-3 | 26.05 | 39.98 | 4.31 | 30.01 | 65.23 | 6.81 |
| BI-RADs-4 | 25.98 | 38.54 | 4.02 | 28.93 | 63.12 | 6.51 |
| BI-RADs-5 | 25.54 | 37.98 | 3.98 | 27.57 | 62.01 | 5.91 |

The average improvement in PSNR, contrast, and EME was also obtained, as shown in the Table 4. For more observations, the visual images of each category were analyzed. Also, the CC views and MLO views of each category were analyzed. It is evident from the experiments that the method 200 can be used as preprocessing steps for the detection of breast cancer. The method 200 has a very fast processing, and it takes on average 21.13 s.

TABLE 4

Performance improvement in PSNR, contrast and EME.

| Category of BI-RADS | PSNR | Contrast | EME |
|---|---|---|---|
| BI-RADs-1 | 4.35 | 26.74 | 3.04 |
| BI-RADs-2 | 4.04 | 25.55 | 2.47 |
| BI-RADs-3 | 3.96 | 25.25 | 2.5 |
| BI-RADs-4 | 2.95 | 24.58 | 2.49 |
| BI-RADs-5 | 2.33 | 24.03 | 1.93 |

Example 4: Comparative Analysis of Image Enhancement with Existing Image Enhancement Techniques The performance of the method 200 was compared with other conventional techniques such as Histogram Equalization (HE), Contrast Limited Adaptive Histogram Equalization (CLAHE), Brightness Preserving Bi-Histogram Equalization (BBHE), Histogram Modified-Local Contrast Enhancement (HM-LCM), Bi-level Histogram Modification Adaptive Nonlinear Filter (BHM-ANF) and Retinex. It is observed from Table 5 and Table 6 that the method 200 outperforms other techniques in improving PSNR, contrast (C) and EME.

TABLE 5

Comparative analysis of the method 200 with existing image enhancement techniques

| Technique | HE | | | CLAHE | | | BBHE | | | The present method 200 | | |
|---|---|---|---|---|---|---|---|---|---|---|---|---|
| Category | PSNR | C | EME | PSNR | C | EME | PSNR | C | EME | PSNR | C | EME |
| BI-RADs-1 | 12.13 | 19.10 | 1.98 | 18.95 | 21.24 | 1.92 | 17.08 | 19.87 | 1.48 | 32.48 | 71.87 | 8.16 |
| BI-RADs-2 | 11.28 | 17.15 | 1.25 | 17.34 | 20.05 | 1.55 | 15.21 | 18.91 | 1.35 | 31.25 | 67.81 | 7.42 |
| BI-RADs-3 | 11.17 | 17.04 | 1.02 | 16.95 | 19.75 | 1.22 | 15.01 | 17.81 | 1.11 | 30.01 | 65.23 | 6.81 |
| BI-RADs-4 | 10.91 | 16.13 | 1.01 | 16.28 | 18.92 | 1.18 | 16.19 | 18.01 | 1.12 | 28.93 | 63.12 | 6.51 |
| BI-RADs-5 | 10.12 | 16.01 | 0.99 | 16.21 | 17.93 | 1.01 | 16.17 | 17.87 | 1.02 | 27.57 | 62.01 | 5.91 |

TABLE 6

Comparative analysis of the method 200 with existing image enhancement techniques

| Technique | HM-LCM | | | BHM-ANF | | | Retinex | | | The present method 200 | | |
|---|---|---|---|---|---|---|---|---|---|---|---|---|
| Category | PSNR | C | EME | PSNR | C | EME | PSNR | C | EME | PSNR | C | EME |
| BI-RADs-1 | 16.23 | 18.22 | 1.92 | 17.35 | 19.03 | 1.98 | 19.98 | 20.12 | 1.62 | 32.48 | 71.87 | 8.16 |
| BI-RADs-2 | 14.38 | 19.35 | 1.55 | 18.84 | 22.01 | 1.67 | 16.34 | 19.72 | 1.43 | 31.25 | 67.81 | 7.42 |
| BI-RADs-3 | 12.37 | 18.24 | 1.22 | 18.35 | 21.25 | 1.52 | 17.32 | 20.06 | 1.47 | 30.01 | 65.23 | 6.81 |
| BI-RADs-4 | 11.71 | 17.27 | 1.02 | 17.63 | 20.64 | 1.08 | 17.07 | 20.31 | 1.43 | 28.93 | 63.12 | 6.51 |
| BI-RADs-5 | 11.32 | 17.09 | 1.09 | 17.01 | 19.97 | 1.06 | 17.21 | 18.37 | 1.32 | 27.57 | 62.01 | 5.91 |

Example 5: Impact of Image Enhancement Technique on Post-Processing

Figure 17:
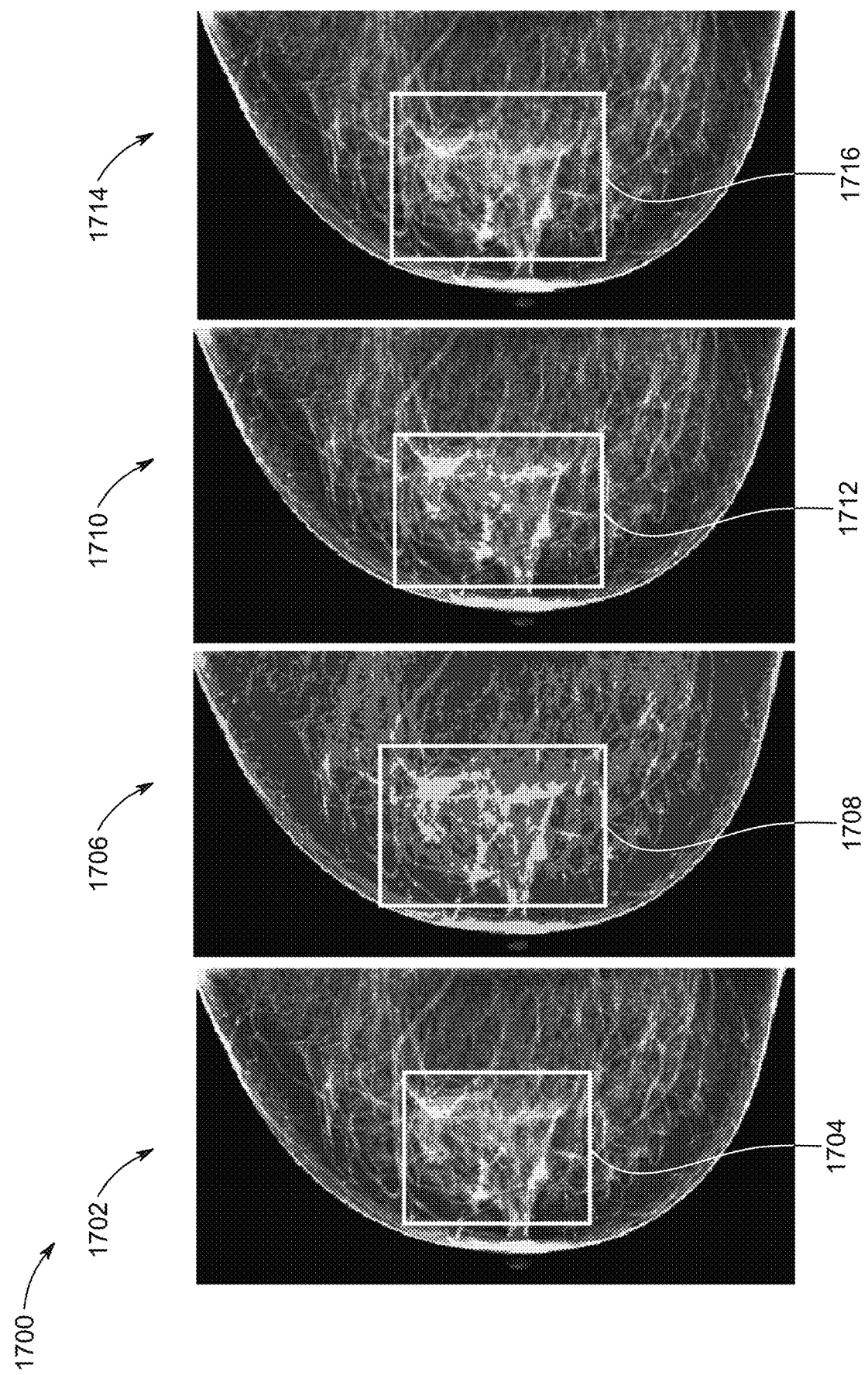
FIG. 17 illustrates enhanced images as an output after post-processing step, according to certain embodiments.

FIG. 17 represents an output 1700 after the post-processing step, according to certain embodiments. In the present disclosure, K-Means clustering was employed for testing the performance of the method 200. K-Means Clustering is an Unsupervised Learning algorithm, which groups the unlabeled dataset into different clusters. Here K defines the number of pre-defined clusters that need to be created in the process, if K=2, there will be two clusters, and for K=3, there will be three clusters, and so on. K-Means Clustering clusters the data into different groups is a convenient way to discover the categories of groups in the unlabeled dataset on its own without the need for any training.

The k-means clustering was analyzed with cluster parameters ranging from 0 to 8. Block 1702 illustrates an efficient output of k-means clustering when the clusters are 2. Block 1706 illustrates an efficient output of k-means clustering when the clusters are 4. Block 1710 illustrates an efficient output of k-means clustering when the clusters are 6. Block 1714 illustrates an efficient output of k-means clustering when the clusters are 8. It is observed in FIG. 17 that the abnormal region can be seen by employing K-Means clustering and is highlighted in the boxes 1704, 1708, 1712 and 1716.

During experiments, the accuracy, sensitivity and specificity of the post-processing output as shown in the Table 7, were measured, and the yielded considerable accuracy that shows the capability of method 200. During the experiment, the database created from Qassim Health Cluster, Qassim Province, Saudi Arabia Hospital was used. Also, the ability of the method 200 was measured by using the Mammographic Image Analysis Society (MIAS) database as many existing methods have used these databases and measured only the Accuracy (AC) parameters. Along with the AC parameters, specificity (SP) and sensitivity (SE) were also measured.

TABLE 7

Performance of the method 200 on Qassim Health Cluster, Qassim Province, Saudi Arabia Hospital database

| Category of BI-RADS | Specificity | Sensitivity | Accuracy |
| --- | --- | --- | --- |
| BI-RADs-1 | 96.98 | 84.12 | 97.09 |
| BI-RADs-2 | 96.18 | 83.14 | 96.89 |
| BI-RADs-3 | 96.11 | 82.98 | 96.74 |
| BI-RADs-4 | 95.18 | 82.83 | 95.12 |
| BI-RADs-5 | 94.98 | 82.19 | 94.87 |

As in the basis on state-of-the-art, previous methods for breast cancer, whether enhancement-, segmentation-, or classification-based methods, did not use all categories of BI-RADS, but the present disclosure has validated the method 200 from negative (BI-RADS-1) to malignant (BI-RADS-5) images.

Numerous modifications and variations of the present disclosure are possible in light of the above teachings. It is therefore to be understood that within the scope of the appended claims, the invention may be practiced otherwise than as specifically described herein.

The invention claimed is:

1. A method of processing a mammogram image, comprising:

receiving a digital mammography image of a breast of a patient;

separating the digital mammography image into three channels, red, green and blue, to obtain three channel images;

removing at least a portion of noise and uneven illumination from each of the three channel images to form a first set of three uniform background images;

separating a luminance channel and a chrominance channel from the first set of three uniform background images with a transfer function to form a second set of three uniform background images;

applying principal component analysis (PCA) to the second set of the three uniform background images to determine an eigenvalue and corresponding eigenvector;

assembling a single grayscale image from a weight of the eigenvalues and corresponding eigenvectors and applying a first subspace projection;

removing at least a portion of a pectoral muscle from the grayscale image with a seed region growth technique to obtain a muscle removed image;

normalizing the muscle removed image using a second order Gaussian Laplacian (LoG) and an oriented diffusion filter to form a processed image; and identifying cancerous and/or noncancerous regions in the processed image and diagnosing the patient.

2. The method of claim 1, wherein the noise and uneven illumination is removed using a bottom-hat operation.

3. The method of claim 1, wherein the noise and uneven illumination is removed using a top-hat operation.

4. The method of claim 1, wherein the noise and uneven illumination is removed using first a bottom-hat operation and then second a top-hat operation.

5. The method of claim 1, further comprising, applying a second and/or third subspace projection.

6. The method of claim 1, wherein at least 90% of the pectoral muscle is removed.

7. The method of claim 1, wherein a seed point in the seed region growth technique is selected by using neighboring pixels of the seed point and determining whether subsequent pixels should be added to the region or not.

8. The method of claim 7, further comprising repeating the determining whether subsequent pixels should be added to the region or not until at least 90% of pectoral muscle is removed.

9. The method of claim 1, wherein the processed image has a signal to noise ratio of at least 30.

10. The method of claim 1, wherein the contrast of the image is increased by at least 50% compared to the same mammogram image but without applying the method.

11. The method of claim 1, wherein the effective measure of enhancement of the image is increased by at least 40% compared to the same mammogram image but without applying the method.

12. The method of claim 1, having an accuracy of detecting a cancerous region of at least 95%.

13. The method of claim 1, wherein the digital mammography image of a breast is received from a hospital and the processed image is sent back to the hospital for diagnosing the patient.

14. The method of claim 13, wherein the digital mammography image of a breast is received from the hospital and sent back to the hospital via a cloud based system.

15. The method of claim 13, wherein the digital mammography image of a breast is received from the hospital and sent back to the hospital via a smart phone application.

16. The method of claim 1, further comprising:
identifying a cancerous region in the processed image and diagnosing the patient with cancer; and
excising the cancerous region from the breast of the patient.

17. The method of claim 1, further comprising:
identifying a cancerous region in the processed image and diagnosing the patient with cancer; and
performing a mastectomy on the patient.

18. The method of claim 1, further comprising:
identifying a cancerous region in the processed image and diagnosing the patient with cancer; and
treating the patient with at least one method selected from the group consisting of chemotherapy, immunotherapy, targeted therapy, radiation therapy, and/or hormonal therapy.

19. The method of claim 1, wherein the processing of the mammogram image has an average duration of 1-60 seconds.

* * * * *